US012155465B2

(12) United States Patent
Veerashetty et al.

(10) Patent No.: US 12,155,465 B2
(45) Date of Patent: Nov. 26, 2024

(54) SYSTEM AND METHOD FOR DOWNLINK MULTI-USER MIMO FEEDBACK

(71) Applicant: Samsung Electronics Co., Ltd., Suwon-si (KR)

(72) Inventors: Pavankumar Veerashetty, San Jose, CA (US); Wook Bong Lee, San Jose, CA (US); Ashok Ranganath, Los Gatos, CA (US); Ravi Gidvani, Fremont, CA (US); Shailender Karmuchi, Fremont, CA (US); Srinivas Kandala, Morgan Hill, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 104 days.

(21) Appl. No.: 17/497,847

(22) Filed: Oct. 8, 2021

(65) Prior Publication Data

US 2022/0216937 A1 Jul. 7, 2022

Related U.S. Application Data

(60) Provisional application No. 63/133,786, filed on Jan. 4, 2021, provisional application No. 63/138,386, filed (Continued)

(51) Int. Cl.
*H04L 1/00* (2006.01)
*H04B 7/06* (2006.01)

(52) U.S. Cl.
CPC ......... *H04L 1/0003* (2013.01); *H04B 7/0617* (2013.01); *H04L 1/0009* (2013.01)

(58) Field of Classification Search
CPC ... H04L 1/0003; H04L 1/0009; H04L 1/0023; H04B 7/0617; H04B 7/0695;

(Continued)

(56) References Cited

U.S. PATENT DOCUMENTS 7,848,444 B2 12/2010 Yamaura
8,731,090 B2 5/2014 Zhang et al.

(Continued)

*Primary Examiner* — Gary Mui
*Assistant Examiner* — Yewon Kim
(74) *Attorney, Agent, or Firm* — Lewis Roca Rothgerber Christie LLP

(57) ABSTRACT

A system and method for downlink feedback in communications between a station and an access point. In some embodiments, the method includes: receiving, from the access point, by the station, a null data packet announcement (NDPA) including a first number of spatial streams, and sending, by the station, to the access point, a Compressed Beamforming Report (CBR) including a second number of spatial streams, different from the first number of spatial streams; or sending, by the station, to the access point, an Operating Mode Indication (OMI) declaring a change in a station Modulation Coding Scheme (MCS) capability for a third number of spatial streams; or sending, by the station, to the access point, an Association Request including a declared Single-User (SU) MCS capability for a first bandwidth and a declared Multi-User (MU) MCS capability for the first bandwidth, the MU MCS capability being different from the SU MCS capability.

14 Claims, 42 Drawing Sheets

Start

Receive a null data packet announcement (NDPA) including a first number of spatial streams
705

Send a Compressed Beamforming Report (CBR) including a second number of spatial streams
710

Send an Operating Mode Indication (OMI) declaring a change in a station Modulation Coding Scheme (MCS) capability for a third number of spatial streams
715

Send a an Association Request comprising a declared Single-User (SU) MCS capability for a first bandwidth and a declared Multi-User (MU) MCS capability for the first bandwidth
720

Related U.S. Application Data on Jan. 15, 2021, provisional application No. 63/141,972, filed on Jan. 26, 2021, provisional application No. 63/143,023, filed on Jan. 28, 2021.

(58) Field of Classification Search
CPC .... H04B 7/063; H04B 7/0417; H04B 7/0452; H04W 28/18; H04W 16/28
See application file for complete search history.

(56) References Cited

U.S. PATENT DOCUMENTS

| | | | | |
|---|---|---|---|---|
| 8,787,841 | B2 | 7/2014 | Ketchum et al. | |
| 8,934,328 | B2 | 1/2015 | Shapira et al. | |
| 9,124,317 | B1 | 9/2015 | Garrett et al. | |
| 9,960,824 | B2 | 5/2018 | Hedayat et al. | |
| 10,505,595 | B2 | 12/2019 | Hedayat et al. | |
| 10,536,932 | B2 | 1/2020 | Chun et al. | |
| 10,826,588 | B2 | 11/2020 | Chun et al. | |
| 2012/0269183 | A1* | 10/2012 | Sohn | H04L 1/0026 370/338 |
| 2013/0215947 | A1 | 8/2013 | Yao et al. | |
| 2014/0192914 | A1 | 7/2014 | Liu et al. | |
| 2014/0247746 | A1* | 9/2014 | You | H04W 24/06 370/252 |
| 2016/0066318 | A1* | 3/2016 | Pereira | H04W 74/06 370/329 |
| 2017/0054542 | A1 | 2/2017 | Vermani et al. | |
| 2017/0170884 | A1* | 6/2017 | Elsherif | H04B 7/0452 |
| 2018/0123655 | A1* | 5/2018 | Yao | H04B 7/0417 |
| 2018/0302194 | A1* | 10/2018 | Wang | H04W 52/0216 |
| 2019/0341988 | A1* | 11/2019 | Schelstraete | H04B 7/0643 |
| 2021/0028962 | A1 | 1/2021 | Schelstraete et al. | |

* cited by examiner

| Frame Control | Duration | Receiver address | Transmitter address | Sounding Token | **STA INFO1 NC = 1** | **STA INFO2 NC=1** | FCS |
|---|---|---|---|---|---|---|---|

FIG. 2A

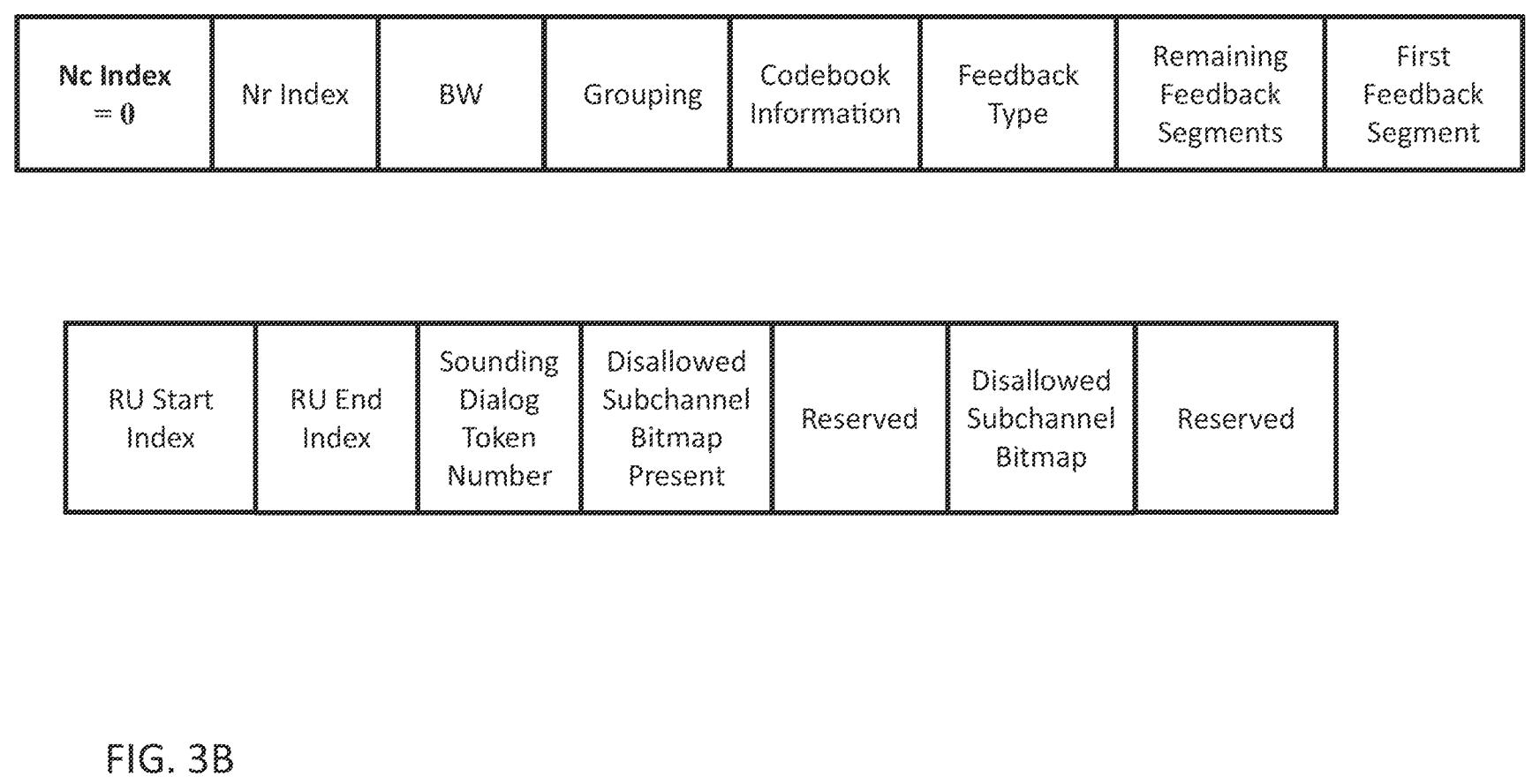

| Nc Index = 0 | Nr Index | BW | Grouping | Codebook Information | Feedback Type | Remaining Feedback Segments | First Feedback Segment |
|---|---|---|---|---|---|---|---|

| RU Start Index | RU End Index | Sounding Dialog Token Number | Disallowed Subchannel Bitmap Present | Reserved | Disallowed Subchannel Bitmap | Reserved |
|---|---|---|---|---|---|---|

FIG. 3B

| Frame Control | Duration | Receiver address | Transmitter address | Sounding Token | **STA INFO1 NC = 1** | **STA INFO2 NC=0** | FCS |
|---|---|---|---|---|---|---|---|

FIG. 4A

| Rx Nss | Channel width | UL MU Disable | Tx NSTS | ER SU Disable | DL MU-MIMO Resound | UL MU Data Disable |
|---|---|---|---|---|---|---|

FIG. 5A

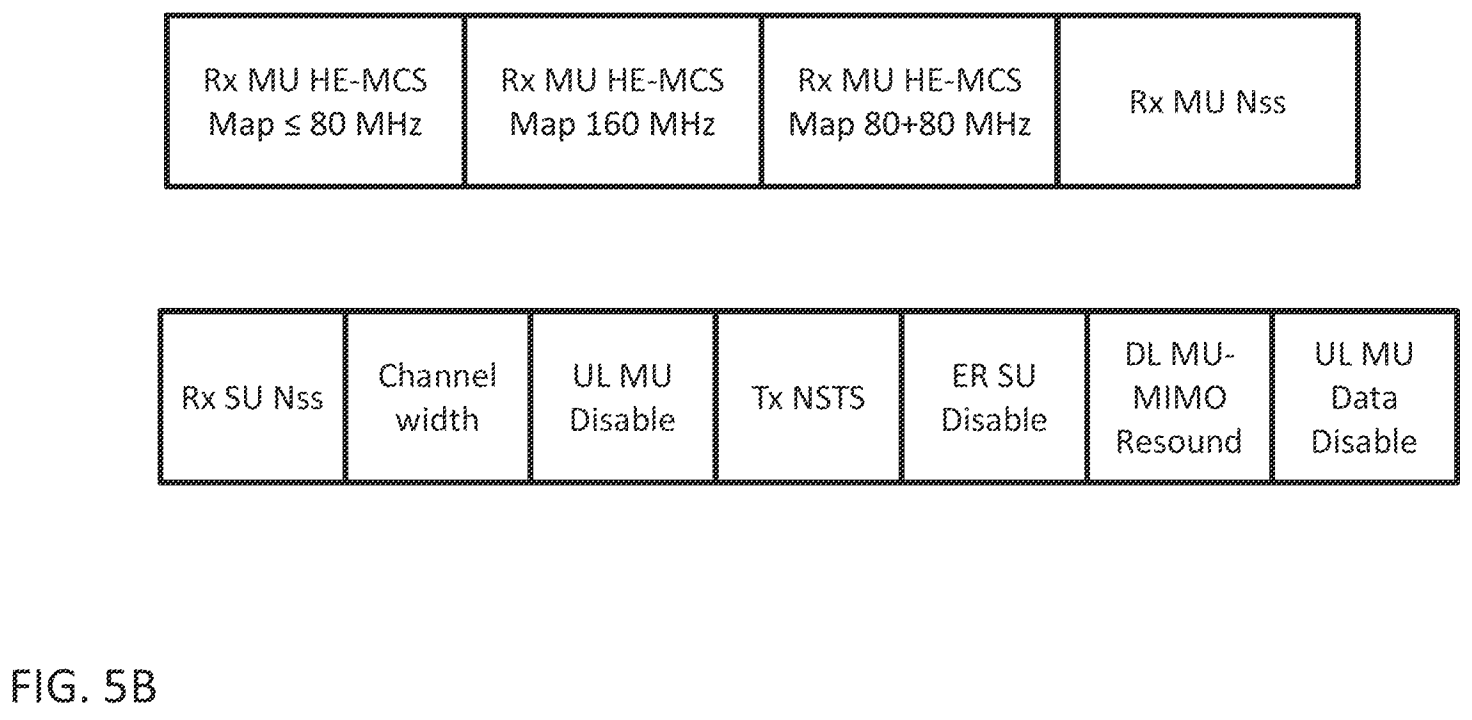

| Rx MU HE-MCS Map ≤ 80 MHz | Rx MU HE-MCS Map 160 MHz | Rx MU HE-MCS Map 80+80 MHz | Rx MU Nss |
| --- | --- | --- | --- |

| Rx SU Nss | Channel width | UL MU Disable | Tx NSTS | ER SU Disable | DL MU-MIMO Resound | UL MU Data Disable |
| --- | --- | --- | --- | --- | --- | --- |

FIG. 5B

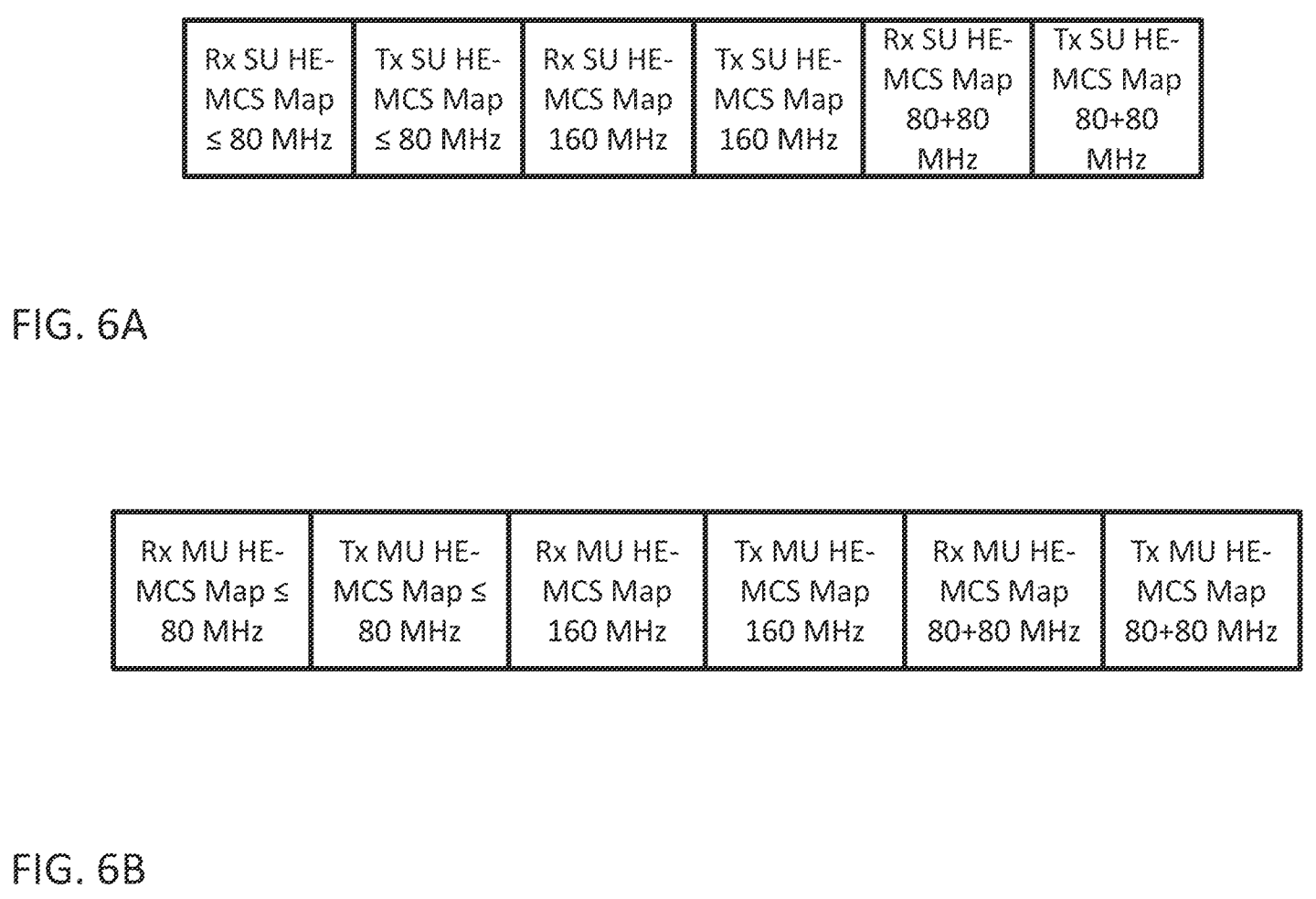

| Rx SU HE-MCS Map ≤ 80 MHz | Tx SU HE-MCS Map ≤ 80 MHz | Rx SU HE-MCS Map 160 MHz | Tx SU HE-MCS Map 160 MHz | Rx SU HE-MCS Map 80+80 MHz | Tx SU HE-MCS Map 80+80 MHz |
|---|---|---|---|---|---|

FIG. 6A

| Rx MU HE-MCS Map ≤ 80 MHz | Tx MU HE-MCS Map ≤ 80 MHz | Rx MU HE-MCS Map 160 MHz | Tx MU HE-MCS Map 160 MHz | Rx MU HE-MCS Map 80+80 MHz | Tx MU HE-MCS Map 80+80 MHz |
|---|---|---|---|---|---|

FIG. 6B

| | Rx EHT-MCS Map ≤ 80 MHz | MU-MIMO Rx EHT-MCS Map ≤ 80 MHz | Tx EHT-MCS Map ≤ 80 MHz | Rx EHT-MCS Map 160 MHz | MU-MIMO Rx EHT-MCS Map 160 MHz | Tx EHT-MCS Map 160 MHz | Rx EHT-MCS Map 320 MHz | MU-MIMO Rx EHT-MCS Map 320 MHz | Tx EHT-MCS Map 320 MHz |
|---|---|---|---|---|---|---|---|---|---|
| Octets: | 4 | 1 | 4 | 0 or 4 | 0 or 1 | 0 or 4 | 0 or 4 | 0 or 1 | 0 or 4 |

FIG. 8

| | B0 B1 | B2 B3 | B4 B5 | B6 B7 | B8 B9 | B10 B11 | B12 B13 | B14 B15 |
|---|---|---|---|---|---|---|---|---|
| | Max EHT-MCS For 1 SS | Max EHT-MCS For 2 SS | Max EHT-MCS For 3 SS | Max EHT-MCS For 4 SS | Max EHT-MCS For 5 SS | Max EHT-MCS For 6 SS | Max EHT-MCS For 7 SS | Max EHT-MCS For 8 SS |
| Bits: | 2 | 2 | 2 | 2 | 2 | 2 | 2 | 2 |

| | B16 B17 | B18 B19 | B20 B21 | B22 B23 | B24 B25 | B26 B27 | B28 B29 | B30 B31 |
|---|---|---|---|---|---|---|---|---|
| | Max EHT-MCS For 9 SS | Max EHT-MCS For 10 SS | Max EHT-MCS For 11 SS | Max EHT-MCS For 12 SS | Max EHT-MCS For 13 SS | Max EHT-MCS For 14 SS | Max EHT-MCS For 15 SS | Max EHT-MCS For 16 SS |
| Bits: | 2 | 2 | 2 | 2 | 2 | 2 | 2 | 2 |

FIG. 9

| | B0 B1 | B2 B3 | B4 B5 | B6 B7 |
|---|---|---|---|---|
| | Max EHT-MCS For 1 SS | Max EHT-MCS For 2 SS | Max EHT-MCS For 3 SS | Max EHT-MCS For 4 SS |
| Bits: | 2 | 2 | 2 | 2 |

FIG. 10

| Order | Information |
|---|---|
| 1 | Category |
| **2** | **VHT Action = Extended Operations Mode Change (Existing/New Value TBD)** |
| **3** | **Extended Operating (Defined in next Section)** |

FIG. 11

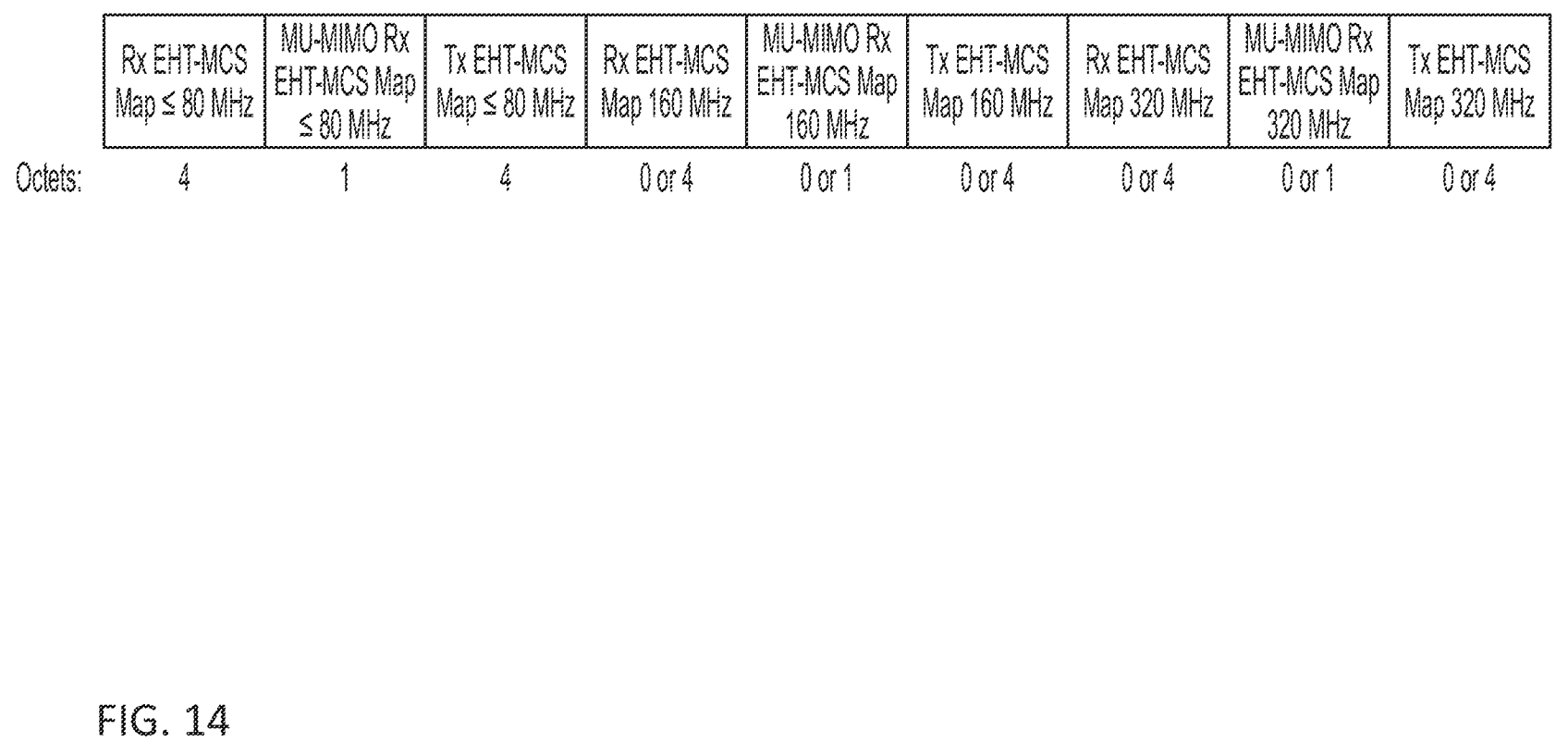

| | Rx EHT-MCS Map ≤ 80 MHz | MU-MIMO Rx EHT-MCS Map ≤ 80 MHz | Tx EHT-MCS Map ≤ 80 MHz | Rx EHT-MCS Map 160 MHz | MU-MIMO Rx EHT-MCS Map 160 MHz | Tx EHT-MCS Map 160 MHz | Rx EHT-MCS Map 320 MHz | MU-MIMO Rx EHT-MCS Map 320 MHz | Tx EHT-MCS Map 320 MHz |
|---|---|---|---|---|---|---|---|---|---|
| Octets: | 4 | 1 | 4 | 0 or 4 | 0 or 1 | 0 or 4 | 0 or 4 | 0 or 1 | 0 or 4 |

FIG. 14

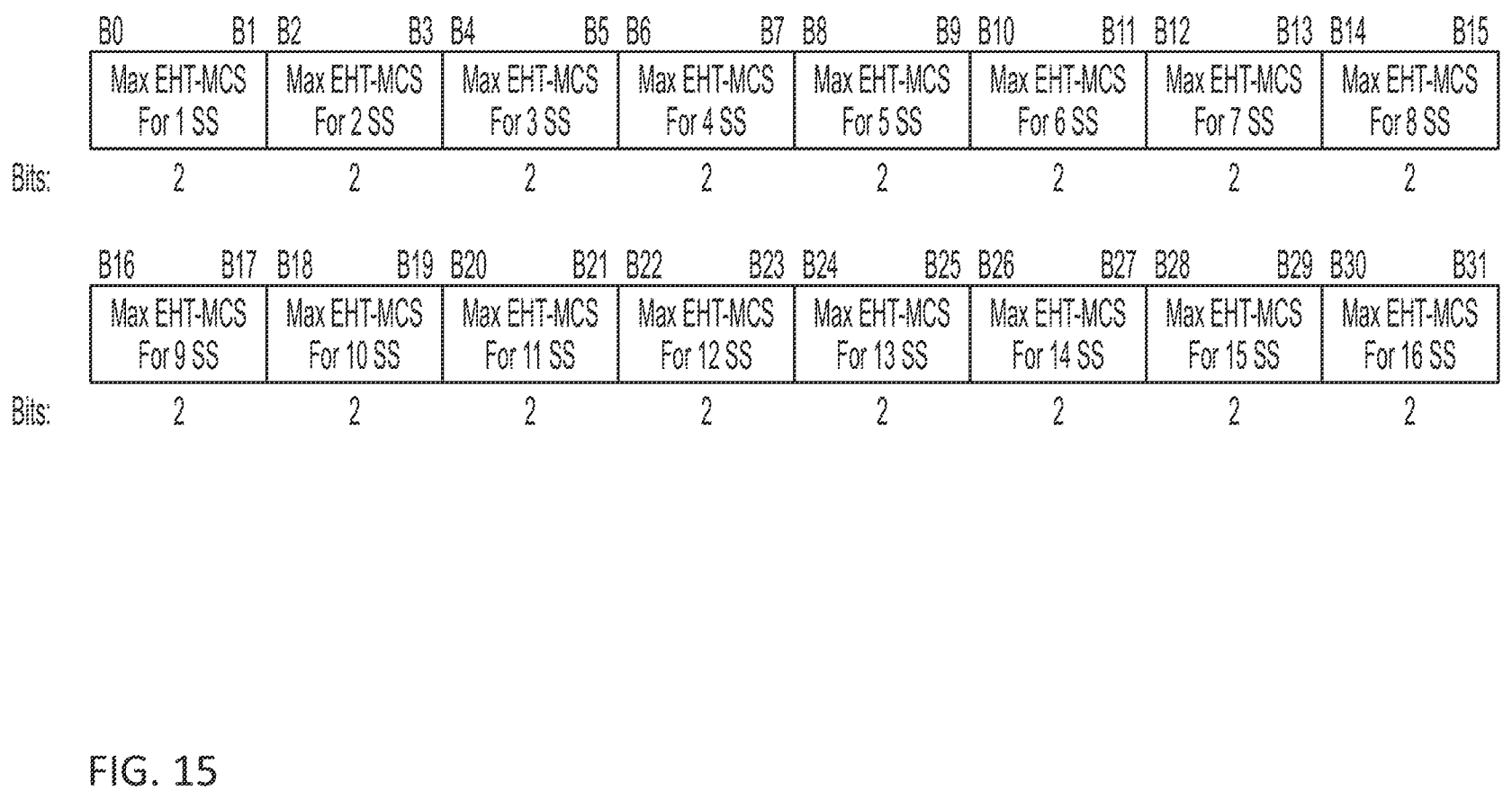

| | B0 B1 | B2 B3 | B4 B5 | B6 B7 | B8 B9 | B10 B11 | B12 B13 | B14 B15 |
|---|---|---|---|---|---|---|---|---|
| | Max EHT-MCS For 1 SS | Max EHT-MCS For 2 SS | Max EHT-MCS For 3 SS | Max EHT-MCS For 4 SS | Max EHT-MCS For 5 SS | Max EHT-MCS For 6 SS | Max EHT-MCS For 7 SS | Max EHT-MCS For 8 SS |
| Bits: | 2 | 2 | 2 | 2 | 2 | 2 | 2 | 2 |

| | B16 B17 | B18 B19 | B20 B21 | B22 B23 | B24 B25 | B26 B27 | B28 B29 | B30 B31 |
|---|---|---|---|---|---|---|---|---|
| | Max EHT-MCS For 9 SS | Max EHT-MCS For 10 SS | Max EHT-MCS For 11 SS | Max EHT-MCS For 12 SS | Max EHT-MCS For 13 SS | Max EHT-MCS For 14 SS | Max EHT-MCS For 15 SS | Max EHT-MCS For 16 SS |
| Bits: | 2 | 2 | 2 | 2 | 2 | 2 | 2 | 2 |

FIG. 15

| | B0 B1 | B2 B3 | B4 B5 | B6 B7 |
|---|---|---|---|---|
| | Max EHT-MCS For 1 SS | Max EHT-MCS For 2 SS | Max EHT-MCS For 3 SS | Max EHT-MCS For 4 SS |
| Bits: | 2 | 2 | 2 | 2 |

FIG. 16

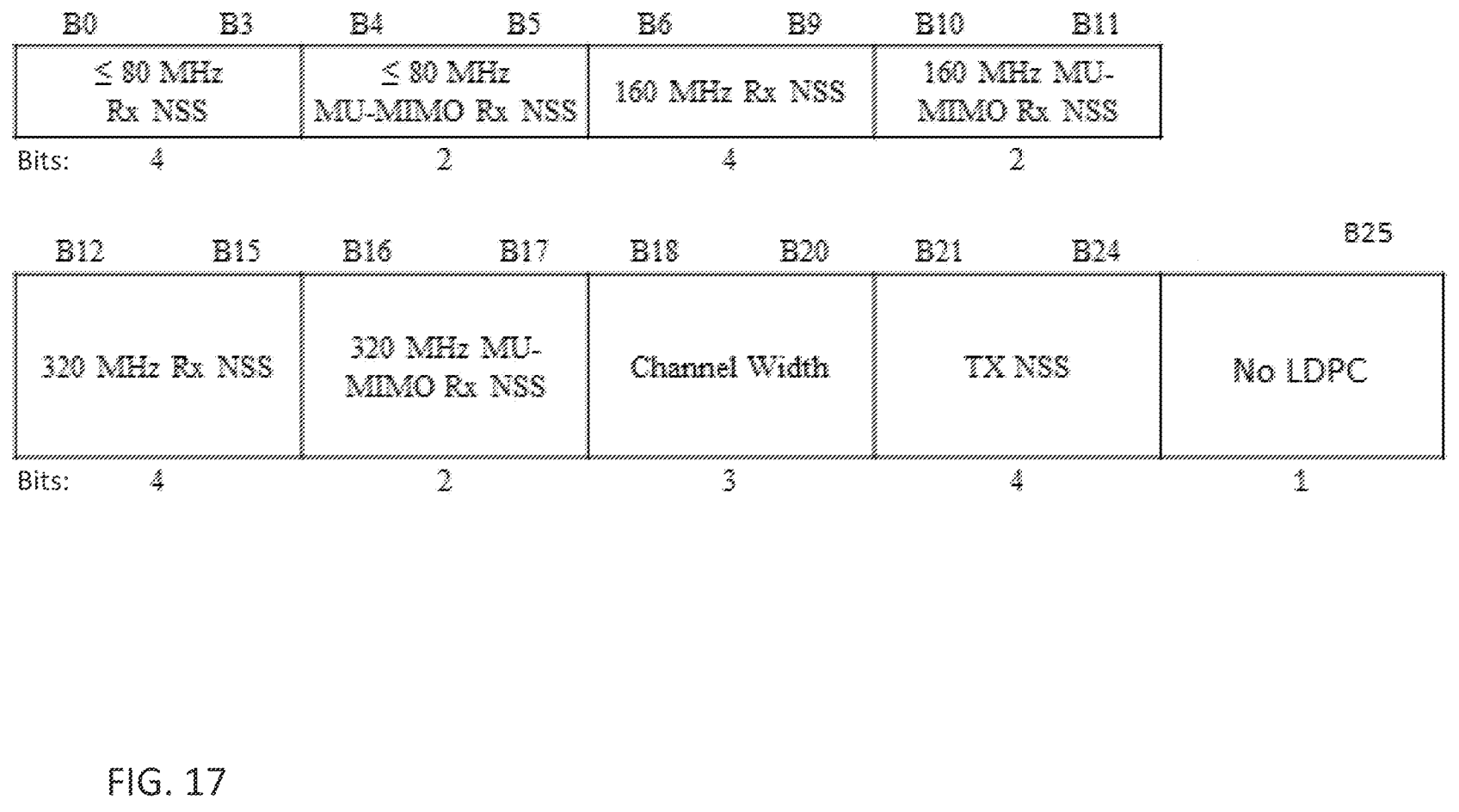

| | B0 B3 | B4 B5 | B6 B9 | B10 B11 |
|---|---|---|---|---|
| | ≤ 80 MHz Rx NSS | ≤ 80 MHz MU-MIMO Rx NSS | 160 MHz Rx NSS | 160 MHz MU-MIMO Rx NSS |
| Bits: | 4 | 2 | 4 | 2 |

| | B12 B15 | B16 B17 | B18 B20 | B21 B24 | B25 |
|---|---|---|---|---|---|
| | 320 MHz Rx NSS | 320 MHz MU-MIMO Rx NSS | Channel Width | TX NSS | No LDPC |
| Bits: | 4 | 2 | 3 | 4 | 1 |

FIG. 17

| Rx HE-MCS Map ≤ 80 MHz | Tx HE-MCS Map ≤ 80 MHz | Rx HE-MCS Map 160 MHz | Tx HE-MCS Map 160 MHz | Rx HE-MCS Map 80+80 MHz | Tx HE-MCS Map 80+80 MHz |
|---|---|---|---|---|---|
| Octets: 2 | 2 | 0 or 2 | 0 or 2 | 0 or 2 | 0 or 2 |

FIG. 21

| | Rx EHT-MCS Map ≤ 80 MHz | MU-MIMO Rx EHT-MCS Map ≤ 80 MHz | Tx EHT-MCS Map ≤ 80 MHz | Rx EHT-MCS Map 160 MHz | MU-MIMO Rx EHT-MCS Map 160 MHz | Tx EHT-MCS Map 160 MHz | Rx EHT-MCS Map 320 MHz | MU-MIMO Rx EHT-MCS Map 320 MHz | Tx EHT-MCS Map 320 MHz |
|---|---|---|---|---|---|---|---|---|---|
| Octets: | 4 | 1 | 4 | 0 or 4 | 0 or 1 | 0 or 4 | 0 or 4 | 0 or 1 | 0 or 4 |

FIG. 23

| | B0 B1 | B2 B3 | B4 B5 | B6 B7 | B8 B9 | B10 B11 | B12 B13 | B14 B15 |
|---|---|---|---|---|---|---|---|---|
| | Max EHT-MCS For 1 SS | Max EHT-MCS For 2 SS | Max EHT-MCS For 3 SS | Max EHT-MCS For 4 SS | Max EHT-MCS For 5 SS | Max EHT-MCS For 6 SS | Max EHT-MCS For 7 SS | Max EHT-MCS For 8 SS |
| Bits: | 2 | 2 | 2 | 2 | 2 | 2 | 2 | 2 |

| | B16 B17 | B18 B19 | B20 B21 | B22 B23 | B24 B25 | B26 B27 | B28 B29 | B30 B31 |
|---|---|---|---|---|---|---|---|---|
| | Max EHT-MCS For 9 SS | Max EHT-MCS For 10 SS | Max EHT-MCS For 11 SS | Max EHT-MCS For 12 SS | Max EHT-MCS For 13 SS | Max EHT-MCS For 14 SS | Max EHT-MCS For 15 SS | Max EHT-MCS For 16 SS |
| Bits: | 2 | 2 | 2 | 2 | 2 | 2 | 2 | 2 |

FIG. 24

| Order | Information |
| --- | --- |
| 1 | Category |
| 2 | EHT |
| 3 | Extended Operating |

FIG. 26

| | B0 B2 | B3 | B4 B7 | B8 B9 | B10 |
|---|---|---|---|---|---|
| | Channel Width | No LDPC | Rx NSS | MU Nc | Rx NSS Type |
| Bits: | 3 | 1 | 4 | 2 | 1 |

FIG. 27

| | Rx EHT-MCS Map ≤ 80 MHz | MU-MIMO Rx EHT-MCS Map ≤ 80 MHz | Tx EHT-MCS Map ≤ 80 MHz | Rx EHT-MCS Map 160 MHz | MU-MIMO Rx EHT-MCS Map 160 MHz | Tx EHT-MCS Map 160 MHz | Rx EHT-MCS Map 320 MHz | MU-MIMO Rx EHT-MCS Map 320 MHz | Tx EHT-MCS Map 320 MHz |
|---|---|---|---|---|---|---|---|---|---|
| Octets: | 4 | 1 | 4 | 0 or 4 | 0 or 1 | 0 or 4 | 0 or 4 | 0 or 1 | 0 or 4 |

FIG. 29

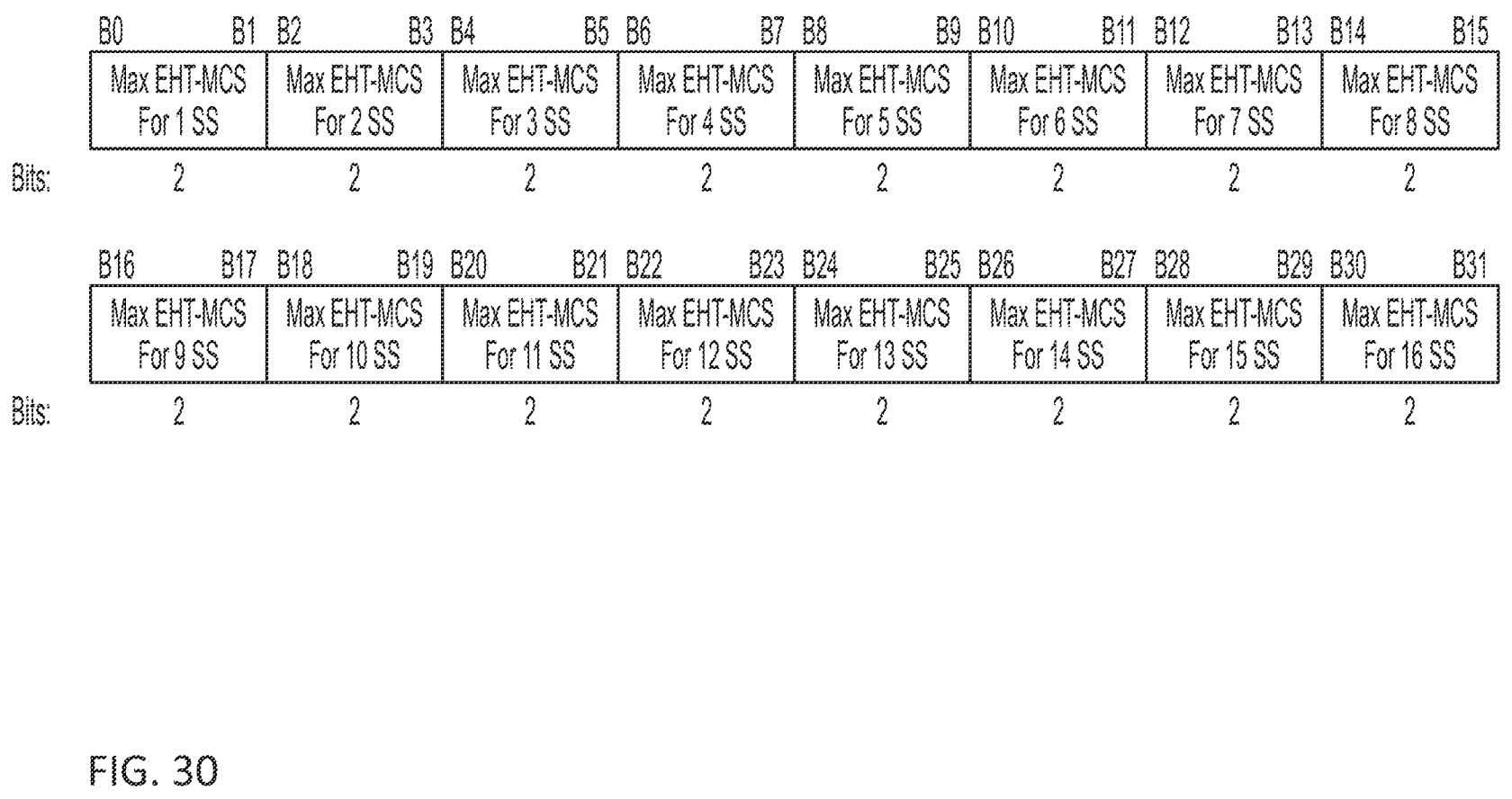

| | B0 B1 | B2 B3 | B4 B5 | B6 B7 | B8 B9 | B10 B11 | B12 B13 | B14 B15 |
|---|---|---|---|---|---|---|---|---|
| | Max EHT-MCS For 1 SS | Max EHT-MCS For 2 SS | Max EHT-MCS For 3 SS | Max EHT-MCS For 4 SS | Max EHT-MCS For 5 SS | Max EHT-MCS For 6 SS | Max EHT-MCS For 7 SS | Max EHT-MCS For 8 SS |
| Bits: | 2 | 2 | 2 | 2 | 2 | 2 | 2 | 2 |

| | B16 B17 | B18 B19 | B20 B21 | B22 B23 | B24 B25 | B26 B27 | B28 B29 | B30 B31 |
|---|---|---|---|---|---|---|---|---|
| | Max EHT-MCS For 9 SS | Max EHT-MCS For 10 SS | Max EHT-MCS For 11 SS | Max EHT-MCS For 12 SS | Max EHT-MCS For 13 SS | Max EHT-MCS For 14 SS | Max EHT-MCS For 15 SS | Max EHT-MCS For 16 SS |
| Bits: | 2 | 2 | 2 | 2 | 2 | 2 | 2 | 2 |

FIG. 30

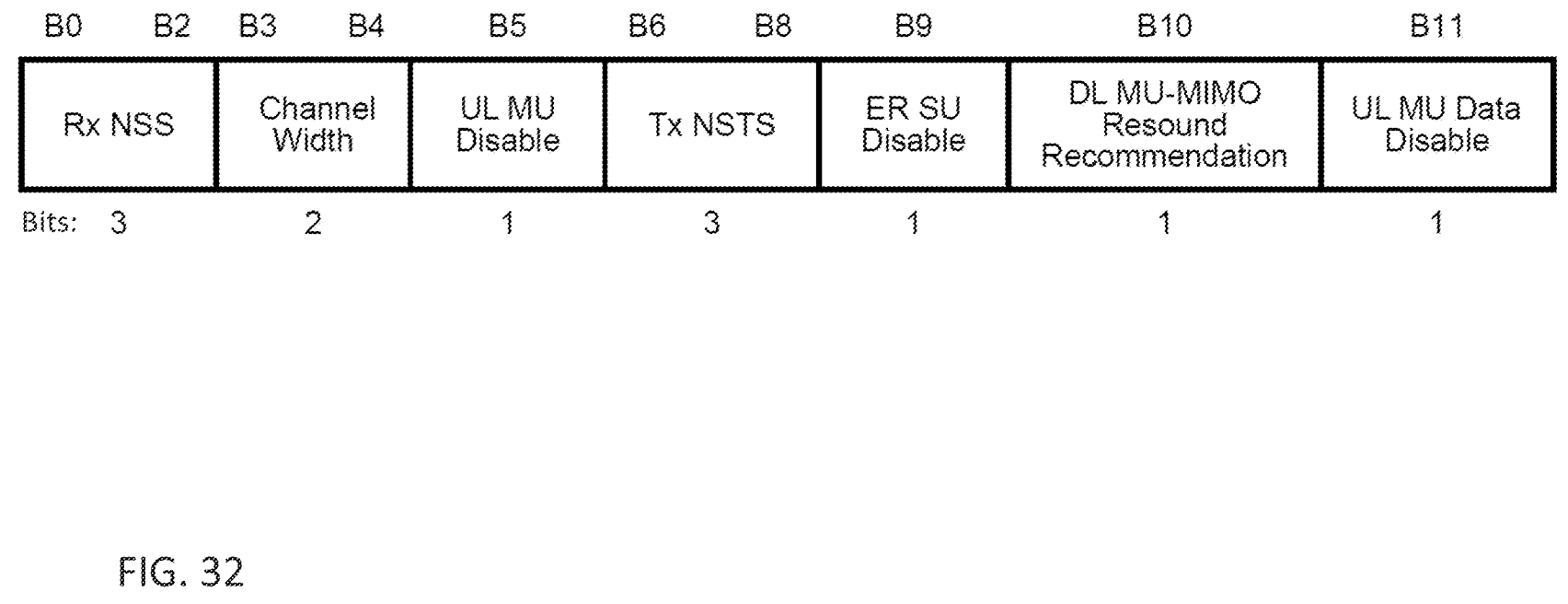

| B0 B2 | B3 B4 | B5 | B6 B8 | B9 | B10 | B11 |
|---|---|---|---|---|---|---|
| Rx NSS | Channel Width | UL MU Disable | Tx NSTS | ER SU Disable | DL MU-MIMO Resound Recommendation | UL MU Data Disable |
| Bits: 3 | 2 | 1 | 3 | 1 | 1 | 1 |

FIG. 32

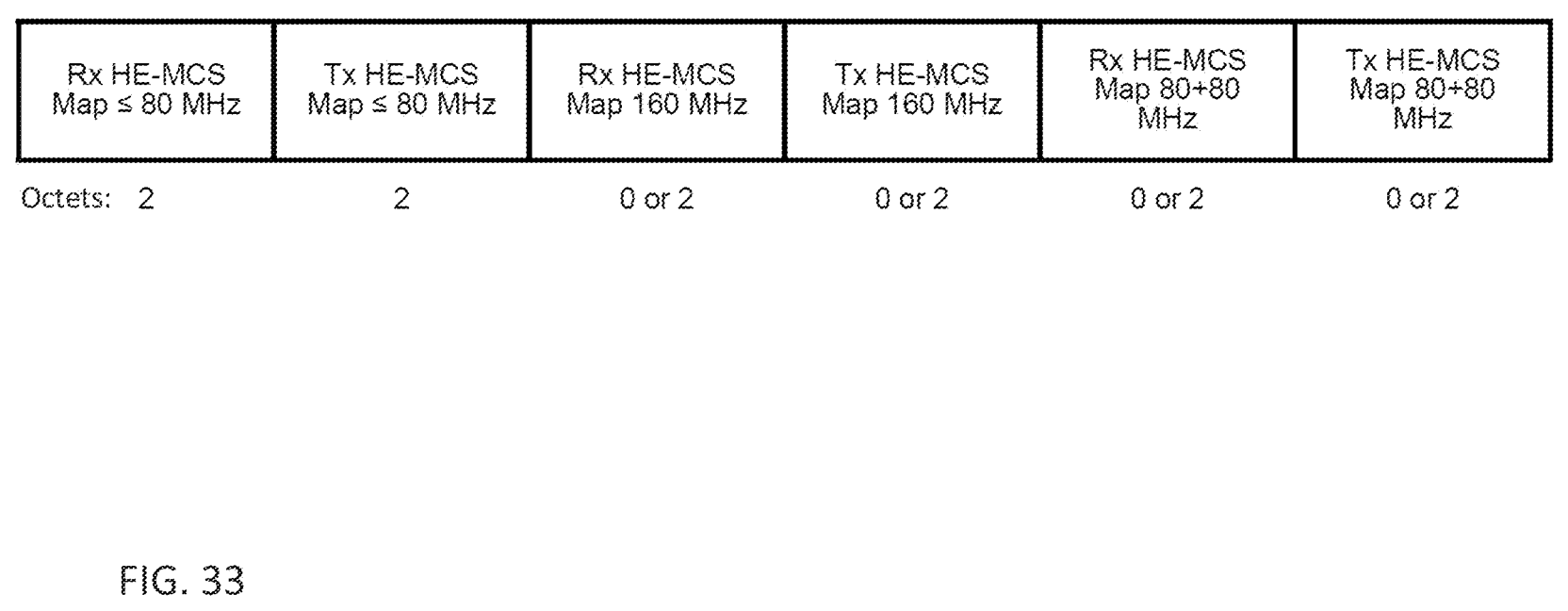

| | Rx HE-MCS Map ≤ 80 MHz | Tx HE-MCS Map ≤ 80 MHz | Rx HE-MCS Map 160 MHz | Tx HE-MCS Map 160 MHz | Rx HE-MCS Map 80+80 MHz | Tx HE-MCS Map 80+80 MHz |
|---|---|---|---|---|---|---|
| Octets: | 2 | 2 | 0 or 2 | 0 or 2 | 0 or 2 | 0 or 2 |

FIG. 33

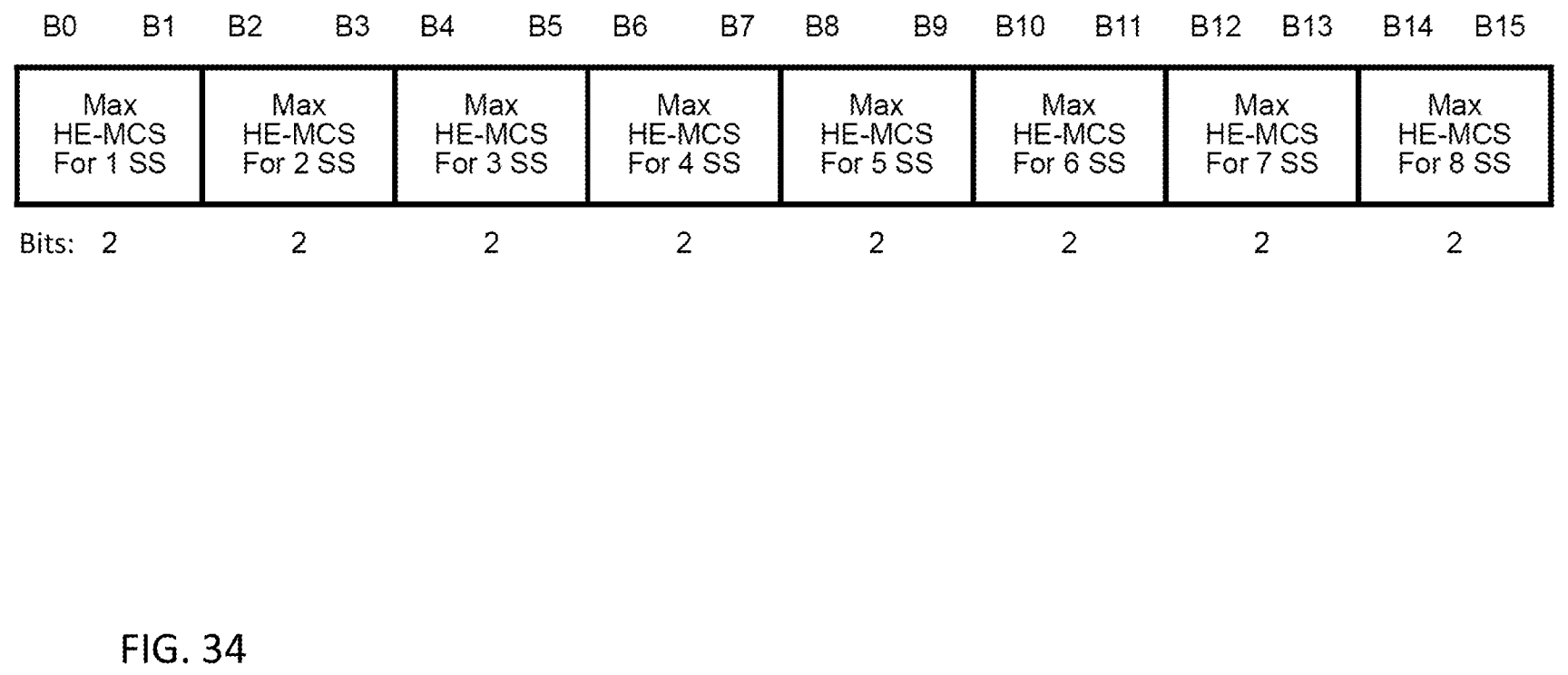

| | B0 B1 | B2 B3 | B4 B5 | B6 B7 | B8 B9 | B10 B11 | B12 B13 | B14 B15 |
|---|---|---|---|---|---|---|---|---|
| | Max HE-MCS For 1 SS | Max HE-MCS For 2 SS | Max HE-MCS For 3 SS | Max HE-MCS For 4 SS | Max HE-MCS For 5 SS | Max HE-MCS For 6 SS | Max HE-MCS For 7 SS | Max HE-MCS For 8 SS |
| Bits: | 2 | 2 | 2 | 2 | 2 | 2 | 2 | 2 |

FIG. 34

SYSTEM AND METHOD FOR DOWNLINK MULTI-USER MIMO FEEDBACK

CROSS-REFERENCE TO RELATED APPLICATION(S)

The present application claims priority to and the benefit of (i) U.S. Provisional Application No. 63/133,786, filed Jan. 4, 2021, entitled "DOWNLINK MULTI-USER-MIMO FEEDBACK ENHANCEMENT", (ii) U.S. Provisional Application No. 63/138,386, filed Jan. 15, 2021, entitled "DOWNLINK MULTI-USER-MIMO FEEDBACK ENHANCEMENT", (iii) U.S. Provisional Application No. 63/141,972, filed Jan. 26, 2021, entitled "DOWNLINK MULTI-USER-MIMO FEEDBACK ENHANCEMENT", and (iv) U.S. Provisional Application No. 63/143,023, filed Jan. 28, 2021, entitled "DOWNLINK MULTI-USER-MIMO FEEDBACK ENHANCEMENT", the contents of all of which are incorporated herein by reference.

FIELD

One or more aspects of embodiments according to the present disclosure relate to wireless communications, and more particularly to a system and method for downlink feedback.

BACKGROUND

In a wireless networking system, an access point may endeavor to set downlink parameters, such as the number of spatial streams and the Modulation Coding Scheme, in a manner that results in good performance, e.g., high throughput to each station. In some circumstances, however, this process may be slow to converge, resulting in potentially significant periods of inferior performance.

Thus, there is a need for a system and method for converging efficiently to arrive at downlink parameters producing good performance.

SUMMARY

According to an embodiment of the present disclosure, there is provided a method for communicating between a station and an access point, the method including: receiving, from the access point, by the station, a null data packet announcement (NDPA) including a first number of spatial streams, and sending, by the station, to the access point, a Compressed Beamforming Report (CBR) including a second number of spatial streams, different from the first number of spatial streams; or sending, by the station, to the access point, an Operating Mode Indication (OMI) declaring a change in a station Modulation Coding Scheme (MCS) capability for a third number of spatial streams; or sending, by the station, to the access point, an Association Request including a declared Single-User (SU) MCS capability for a first bandwidth and a declared Multi-User (MU) MCS capability for the first bandwidth, the MU MCS capability being different from the SU MCS capability.

In some embodiments, the method includes receiving, from the access point, by the station, a null data packet announcement including a first number of spatial streams, and sending, by the station, to the access point, a Compressed Beamforming Report including a second number of spatial streams, different from the first number of spatial streams.

In some embodiments, the method further includes receiving, by the station, a Physical Layer Protocol Data Unit (PPDU) via the second number of spatial streams.

In some embodiments, the method includes sending, by the station, to the access point, an Operating Mode Indication (OMI) declaring a change in a station Modulation Coding Scheme capability for a third number of spatial streams.

In some embodiments, the method further includes receiving, by the station, after the sending of the OMI, a Physical Layer Protocol Data Unit (PPDU) with a first MCS index less than or equal to an MCS index declared, as a capability, in the OMI.

In some embodiments, the method further includes receiving, by the station, before the sending of the OMI, a Physical Layer Protocol Data Unit (PPDU) with a first MCS index greater than an MCS index declared, as a capability, in the OMI.

In some embodiments, the method includes sending, by the station, to the access point, an Association Request including a declared SU MCS capability for a first bandwidth and a declared MU MCS capability for the first bandwidth, the MU MCS capability being different from the SU MCS capability.

In some embodiments, the SU MCS capability is greater than the MU MCS capability, the method further including receiving, in SU mode, a Physical Layer Protocol Data Unit (PPDU) with an MCS index greater than the MU MCS capability and less than or equal to the SU MCS capability.

In some embodiments, the SU MCS capability is less than or equal to the MU MCS capability, the method further including receiving, in MU mode, a Physical Layer Protocol Data Unit (PPDU) with an MCS index less than or equal to the MU MCS capability and greater than the SU MCS capability.

According to an embodiment of the present disclosure, there is provided a system including: a station including a radio and a processing circuit, the processing circuit being configured to: receive, from an access point, a null data packet announcement (NDPA) including a first number of spatial streams, and send, to the access point, a Compressed Beamforming Report (CBR) including a second number of spatial streams, different from the first number of spatial streams; or send, to the access point, an Operating Mode Indication (OMI) declaring a change in a station Modulation Coding Scheme (MCS) capability for a third number of spatial streams; or send, to the access point, an Association Request including a declared Single-User (SU) MCS capability for a first bandwidth and a declared Multi-User (MU) MCS capability for the first bandwidth, the MU MCS capability being different from the SU MCS capability.

In some embodiments: the processing circuit is configured to: receive, from the access point, a null data packet announcement including a first number of spatial streams, and send, to the access point, a Compressed Beamforming Report including a second number of spatial streams, different from the first number of spatial streams.

In some embodiments, the processing circuit is further configured to receive a Physical Layer Protocol Data Unit (PPDU) via the second number of spatial streams.

In some embodiments: the processing circuit is configured to send, to the access point, an OMI declaring a change in a station Modulation Coding Scheme capability for a third number of spatial streams; and the processing circuit is further configured to receive, after the sending of the OMI, a Physical Layer Protocol Data Unit (PPDU) with a first MCS index less than or equal to an MCS index declared, as a capability, in the OMI.

In some embodiments: the processing circuit is configured to send, to the access point, an Association Request including a declared SU MCS capability for a first bandwidth and a declared MU MCS capability for the first bandwidth, the MU MCS capability being different from the SU MCS capability.

In some embodiments: the SU MCS capability is greater than the MU MCS capability; and the processing circuit is further configured to receive, in SU mode, a Physical Layer Protocol Data Unit (PPDU) with an MCS index greater than the MU MCS capability and less than or equal to the SU MCS capability.

According to an embodiment of the present disclosure, there is provided a method for communicating between a station and an access point, the method including: sending, by the access point, to the station, a null data packet announcement (NDPA) including a first number of spatial streams, and receiving, from the station, by the access point, a Compressed Beamforming Report (CBR) including a second number of spatial streams, different from the first number of spatial streams; or receiving, from the station, by the access point, an Operating Mode Indication (OMI) declaring a change in a station Modulation Coding Scheme capability for a third number of spatial streams; or receiving, from the station, by the access point, an Association Request including a declared Single-User (SU) MCS capability for a first bandwidth and a declared Multi-User (MU) MCS capability for the first bandwidth, the MU MCS capability being different from the SU MCS capability.

In some embodiments, the method includes sending, by the access point, to the station, a null data packet announcement including a first number of spatial streams, and receiving, from the station, by the access point, a Compressed Beamforming Report including a second number of spatial streams, different from the first number of spatial streams, further including sending, by the access point, to the station, a Physical Layer Protocol Data Unit (PPDU) via the second number of spatial streams.

In some embodiments, the method further includes receiving, from the station, by the access point, a Physical Layer Protocol Data Unit via the second number of spatial streams.

In some embodiments, the method includes receiving, from the station, by the access point, an Operating Mode Indication declaring a change in a station Modulation Coding Scheme capability for a third number of spatial streams, further including sending, by the access point, to the station, after the receiving of the OMI, a Physical Layer Protocol Data Unit (PPDU) with a first MCS index less than or equal to an MCS index declared, as a capability, in the OMI.

In some embodiments, the method includes receiving, from the station, by the access point, an Association Request including a declared SU MCS capability for a first bandwidth and a declared MU MCS capability for the first bandwidth, the MU MCS capability being different from the SU MCS capability, wherein the SU MCS capability is greater than the MU MCS capability, the method further including sending, by the access point, to the station, in SU mode, a Physical Layer Protocol Data Unit (PPDU) with an MCS index greater than the MU MCS capability and less than or equal to the SU MCS capability.

BRIEF DESCRIPTION OF THE DRAWINGS

These and other features and advantages of the present disclosure will be appreciated and understood with reference to the specification, claims, and appended drawings wherein:

FIG. 2A shows a frame format, according to an embodiment of the present disclosure;

FIG. 3B shows a frame format, according to an embodiment of the present disclosure;

FIG. 4A shows a frame format, according to an embodiment of the present disclosure;

FIG. 5A shows a frame format, according to an embodiment of the present disclosure;

FIG. 5B shows a frame format, according to an embodiment of the present disclosure;

FIG. 6A shows a frame format, according to an embodiment of the present disclosure;

FIG. 6B shows a frame format, according to an embodiment of the present disclosure;

FIG. 8 shows a frame format, according to an embodiment of the present disclosure;

FIG. 9 shows a frame format, according to an embodiment of the present disclosure;

FIG. 10 shows a frame format, according to an embodiment of the present disclosure;

FIG. 11 is a table showing a field format, according to an embodiment of the present disclosure;

FIG. 14 shows a frame format, according to an embodiment of the present disclosure;

FIG. 15 shows a frame format, according to an embodiment of the present disclosure;

FIG. 16 shows a frame format, according to an embodiment of the present disclosure;

FIG. 17 shows a frame format, according to an embodiment of the present disclosure;

FIG. 21 shows a frame format, according to an embodiment of the present disclosure;

FIG. 23 shows a frame format, according to an embodiment of the present disclosure;

FIG. 24 shows a frame format, according to an embodiment of the present disclosure;

FIG. 26 is a table showing a field format, according to an embodiment of the present disclosure;

FIG. 27 shows a frame format, according to an embodiment of the present disclosure;

FIG. 29 shows a frame format, according to an embodiment of the present disclosure;

FIG. 30 shows a frame format, according to an embodiment of the present disclosure;

FIG. 32 shows a frame format, according to an embodiment of the present disclosure;

FIG. 33 shows a frame format, according to an embodiment of the present disclosure; and FIG. 34 shows a frame format, according to an embodiment of the present disclosure.

DETAILED DESCRIPTION

Figure 1:
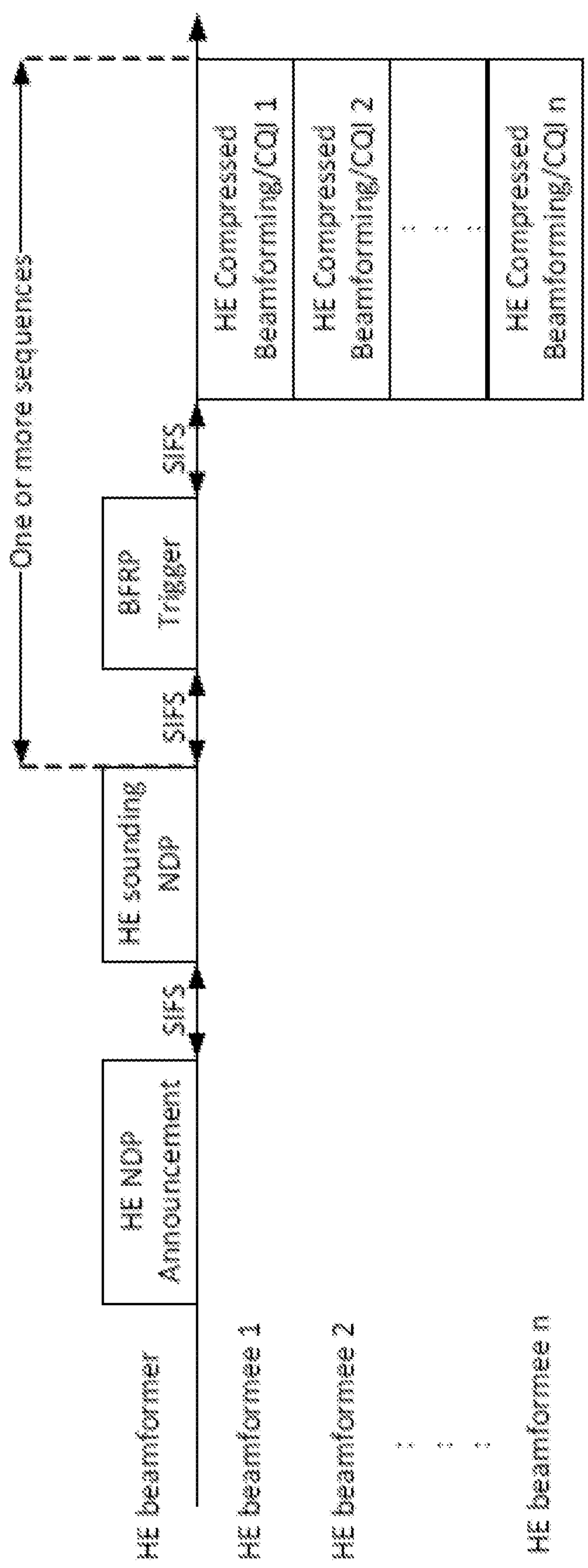
FIG. 1 is a message sequence diagram, according to an embodiment of the present disclosure.

The detailed description set forth below in connection with the appended drawings is intended as a description of exemplary embodiments of a system and method for downlink feedback provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a Wi-Fi system, an access point (AP) (which may also be referred to as a beamformer) may send a null data packet announcement (NDPA) to poll feedback from non-AP stations to perform Multi-User-Multiple-Input-Multiple-Output (MU MIMO) beamforming. Depending on the algorithm of the AP, MU-MIMO performance may vary, especially when the AP does not optimally select the number of streams for each user. In a Wi-Fi Single-User (SU) beamforming case, a non-AP station (which may also be referred to as a beamformee) may select the number of spatial streams to report. In legacy WiFi systems, a non-AP station may report, or "declare" its capabilities with respect to the number of spatial streams it is capable of supporting, and the Modulation Coding Schemes (MCS) it is capable of supporting, but it may not be able to declare one set of such capabilities for operation in SU mode and a different set of capabilities for operation in Multi-User (MU) mode.

In some embodiments, a beamformee is able to influence beamforming capabilities of a beamformer at every sounding sequence. The beamformee may select, in the feedback, a number of spatial streams that may be equal to or less than the number that the beamfomer has requested in the NDPA. The beamformee may further declare support, after association, for a different number of spatial streams, for multi-user operation, than what was negotiated during association. That is, the beamformee may declare support, after association (e.g., in an Operating Mode Indication (OMI), as discussed in further detail below) (i) for a first maximum number of spatial streams and for a first set of MCS levels in SU mode, and (ii) for a second maximum number of spatial streams and for a second set of MCS levels in MU mode, the second maximum number of spatial streams being different from the first, or the second set of MCS levels being different from the first. Moreover, the beamformee may, in some embodiments, declare support, during association (e.g., in an Association Request, as discussed in further detail below) (i) for a first maximum number of spatial streams and for a first set of MCS levels in SU mode, and (ii) for a second maximum number of spatial streams and for a second set of MCS levels in MU mode, the second maximum number of spatial streams being different from the first, or the second set of MCS levels being different from the first.

A non-AP station (or "STA", or simply "station") may determine the number of spatial streams for MU and use a mechanism such as one of the following, to change the allocated number of spatial streams in the MU-MIMO packet, thereby optimizing both SU and MU throughput and improving MU gain for beams formed under certain channel conditions: (i) the beamformee may influence beamforming configuration of the beamformer at every sounding sequence, (ii) the beamformee may select, in the feedback, a number of spatial streams less than or equal to the number of spatial streams the beamfomer has requested in the NDPA, (iii) the beamformee may declare, to the beamformer, support for a different number of spatial streams for MU than the number that was negotiated during association, or (iv), the beamformee may declare, to the beamformer, support for a different number of spatial streams, and different MCS support, for SU and for MU.

As mentioned above, a beamformee may select the number of spatial streams in the feedback to be equal to or less than what the beamformer has requested in the NDPA. A High-Efficiency Trigger-Based (HE TB) sounding sequence is a sounding sequence initiated by an HE beamformer using a burst of three frames that includes a broadcast HE NDP Announcement frame with two or more STA Info fields followed, after a Short Interframe Space (SIFS), by an HE sounding NDP followed, after a SIFS by a Beamforming Report Poll (BFRP) Trigger frame. An example of an HE TB sounding protocol with more than one HE beamformee is shown in FIG. 1, which is an example of a sounding protocol with more than one HE beamformee.

In legacy Wi-Fi, a beamformee always provides feedback, in a Compressed Beamforming Report (CBR), indicating the same number of spatial streams as the number that was requested (using NC=n, where the number of spatial streams is n plus one) by the beamformer. Due to this, in noisy environment scenarios, beamformee performance may be adversely impacted. An example of this is shown in FIG. 2A and FIG. 2B, which show the NDPA request from a beamformer and the corresponding CBR sent to the beamformer by the beamformee.

Figure 2A:
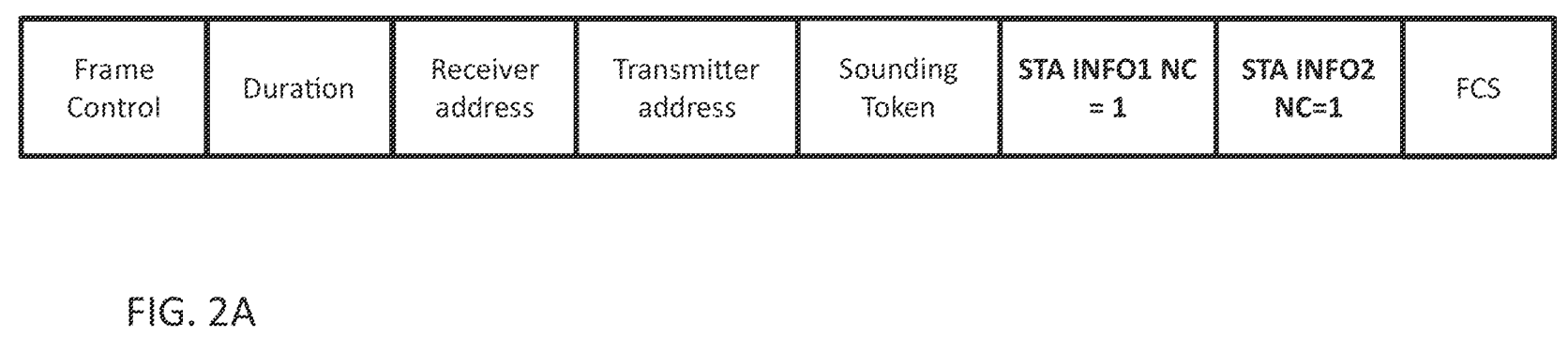
Figure 2B:
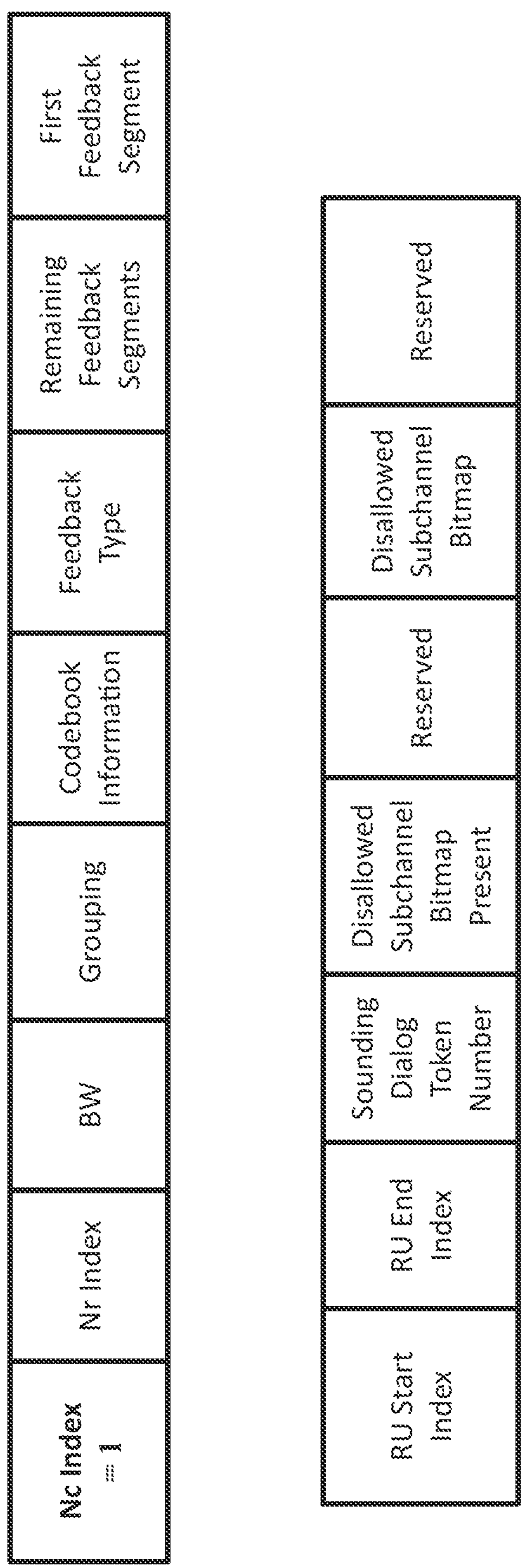
FIG. 2B shows a frame format, according to an embodiment of the present disclosure.
Figure 2C:
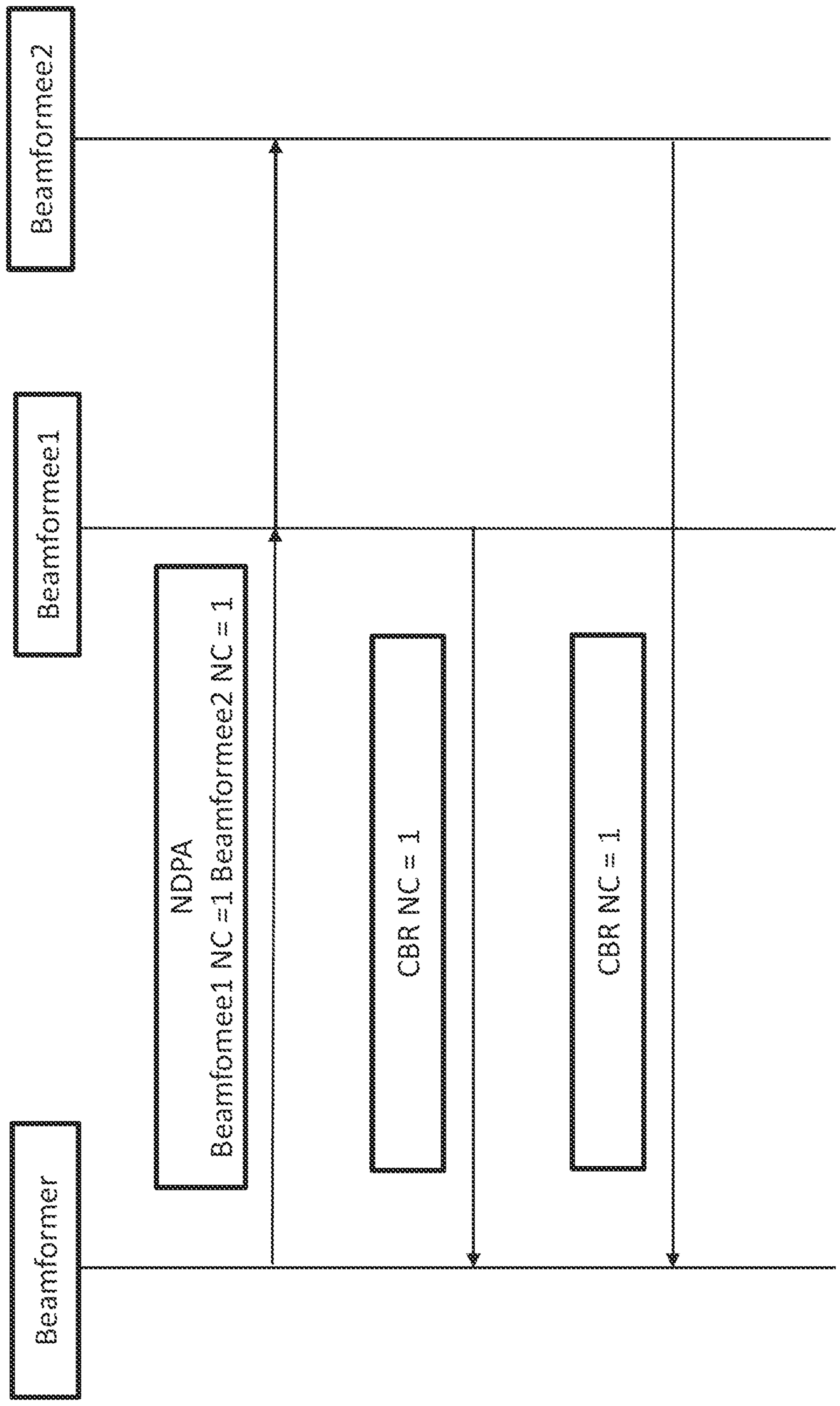
FIG. 2C is a message flow diagram, according to an embodiment of the present disclosure.

For example, FIG. 2A shows the beamformer specifying (using NC=1), two spatial streams for STA1 and two spatial streams for STA2, and FIG. 2B shows the response from beamformee 1, responding (using NC=1) with a request for two spatial streams. In general, a beamformer may send NC=n, where the number of spatial streams specified by the beamformer is n plus one, and the beamformee may respond with NC=m, where the number of spatial streams requested by the beamformee is m plus one, and where, in legacy systems, m=n. The messages sent in both directions are illustrated as a time sequence in FIG. 2C.

Figure 3A:
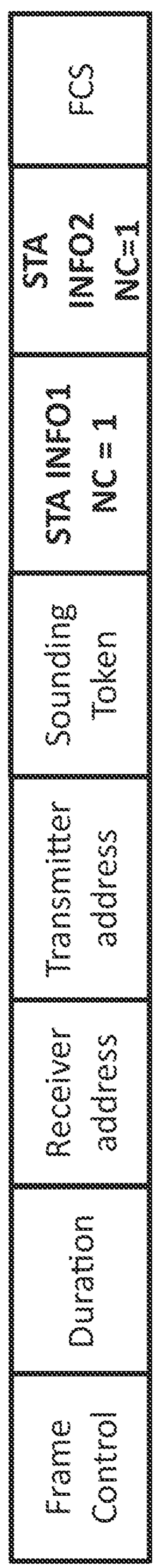
FIG. 3A shows a frame format, according to an embodiment of the present disclosure.
Figure 3C:
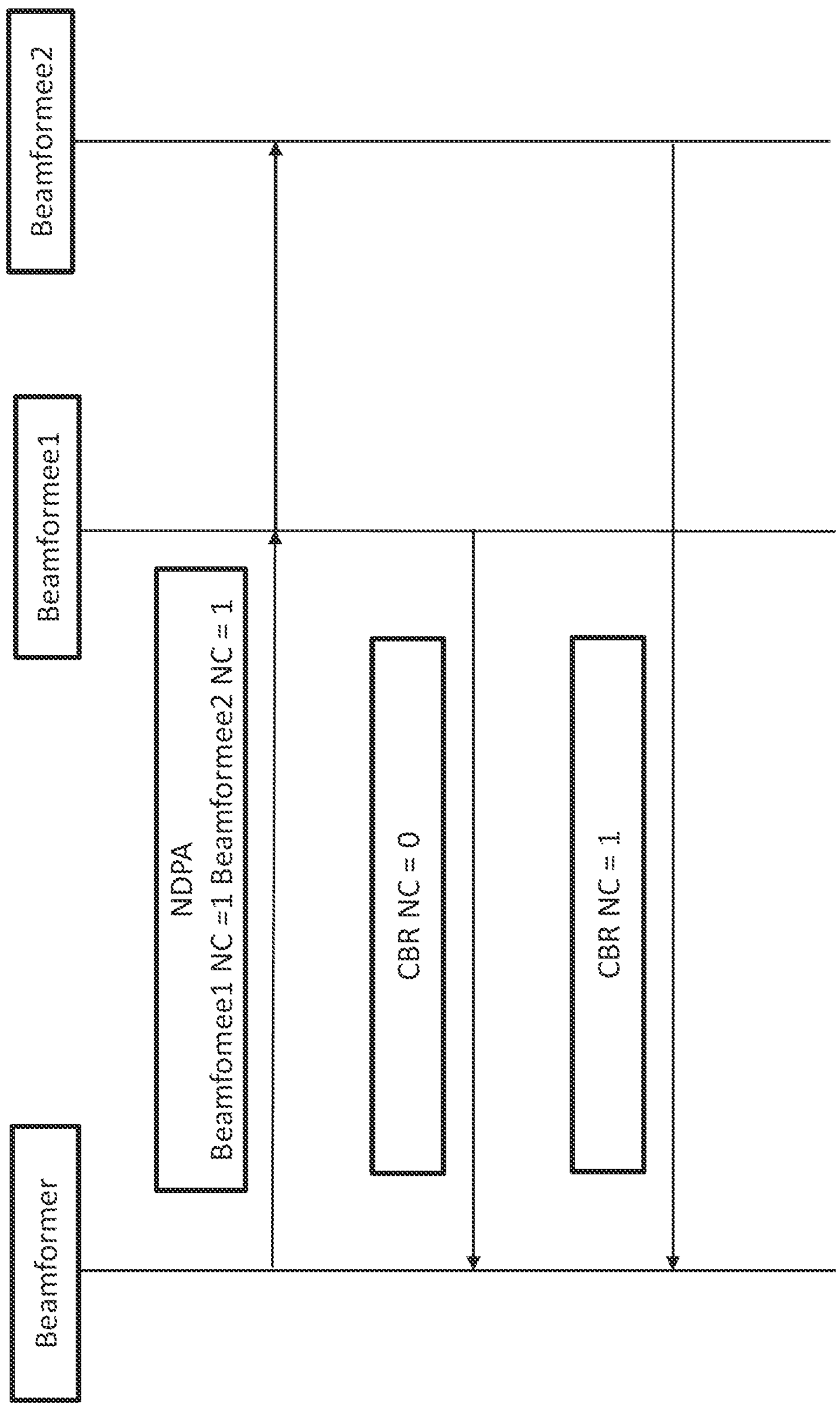
FIG. 3C is a message flow diagram, according to an embodiment of the present disclosure.

In some embodiments, a beamformee may dynamically select the number of spatial streams requested in the feedback based on other beamformees that are present in an MU group. For example, FIG. 3A shows the beamformer specifying (using NC=1), two spatial streams for STA1 and two spatial streams for STA2, and FIG. 3B shows the response from beamformee 1, responding (using NC=0) with a request for one spatial stream. The messages sent in both directions are illustrated as a time sequence in FIG. 3C. In such a circumstance, the beamformer may treat the request, from beamformee 1, for one spatial stream, as an instruction, and transition to one spatial stream for further transmissions to beamformee 1, e.g., it may then send, and beamformee 1 may receive, a Physical Layer Protocol Data Unit (PPDU) via the number of spatial streams requested by beamformee 1 (e.g., via 1 spatial stream in the example of FIGS. 3A-3C), and beamformee 1 may send, and the beamformer may receive, a Physical Layer Protocol Data Unit via the number of spatial streams requested by beamformee 1 (e.g., via 1 spatial stream in the example of FIGS. 3A-3C). In some embodiments the beamformer may treat the request, from beamformee 1, for one spatial stream as a suggestion, and the beamformer may make a determination regarding the number of spatial streams to be used, the determination being based in part on the suggestion received from beamformee 1.

Figure 4A:
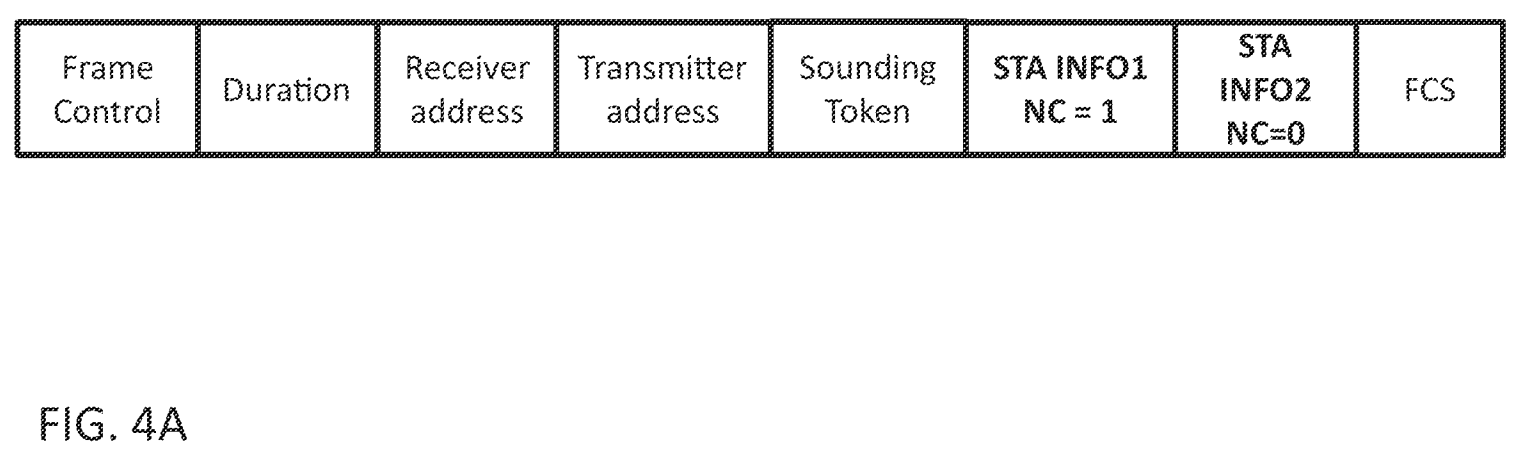
Figure 4B:
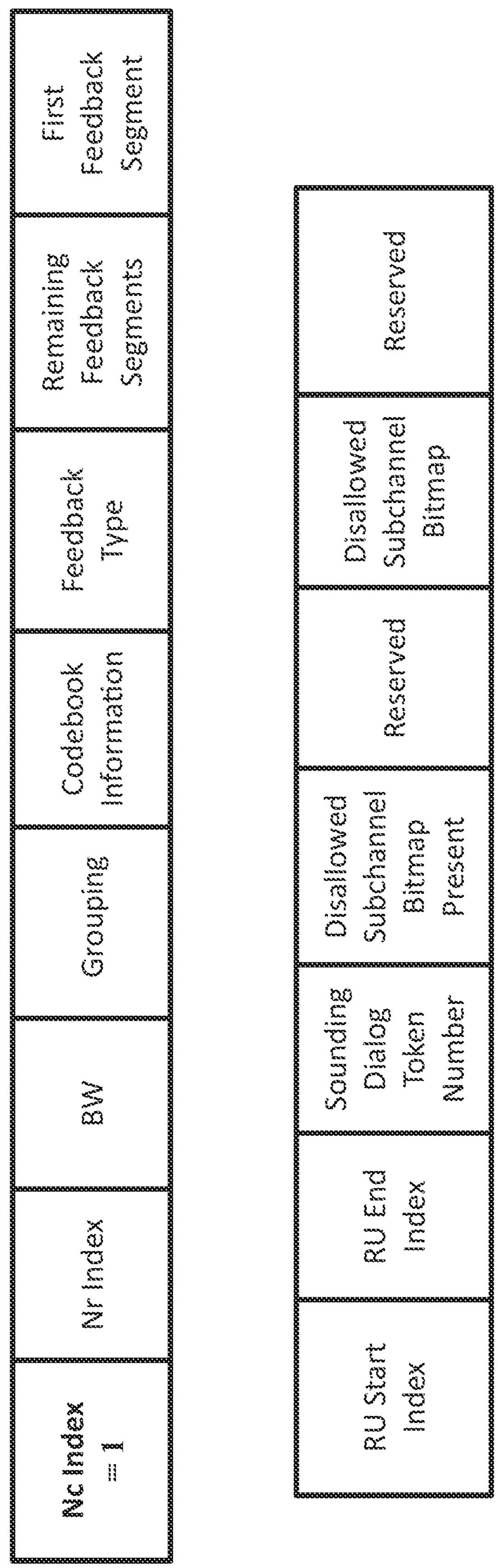
FIG. 4B shows a frame format, according to an embodiment of the present disclosure.
Figure 4C:
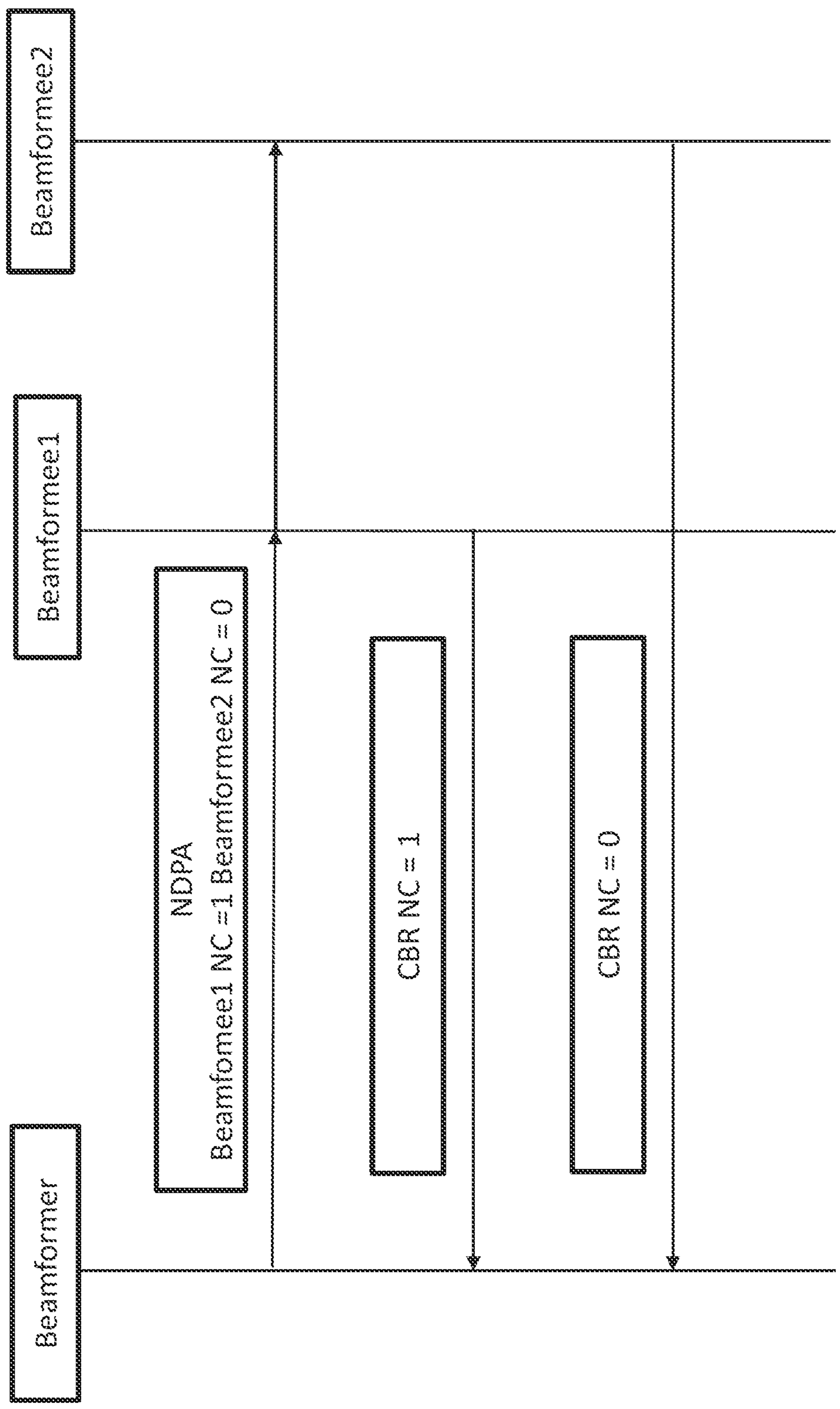
FIG. 4C is a message flow diagram, according to an embodiment of the present disclosure.

In another example, FIG. 4A shows the beamformer specifying (using NC=1), two spatial streams for STA1 and (using NC=0) one spatial stream for STA2, and FIG. 4B shows the response from beamformee 1, responding (using NC=1) with a request for two spatial streams. The messages sent in both directions (including the response from beamformee 2, responding (using NC=0) with a request for one spatial stream) are illustrated as a time sequence in FIG. 4C.

In some embodiments, a beamformee may declare support for a different number of spatial streams for MU to the beamformer than what was negotiated during association.

In a legacy system, the beamformer may always group the beamformee based on the initial configuration that was negotiated during association. If a beamformee's performance is poor with the configuration that was negotiated during association, then it is up to the beamformer algorithm to detect it and fall back to lower configuration; this may have a significant adverse impact on the throughput, until the configuration is changed. As such, it may be beneficial for the beamformee to hasten the change, using feedback, e.g., by declaring a change in the beamformee's capability. As used herein, "declaring a change" in a station capability means declaring a capability different from a previously declared capability.

Figure 5A:
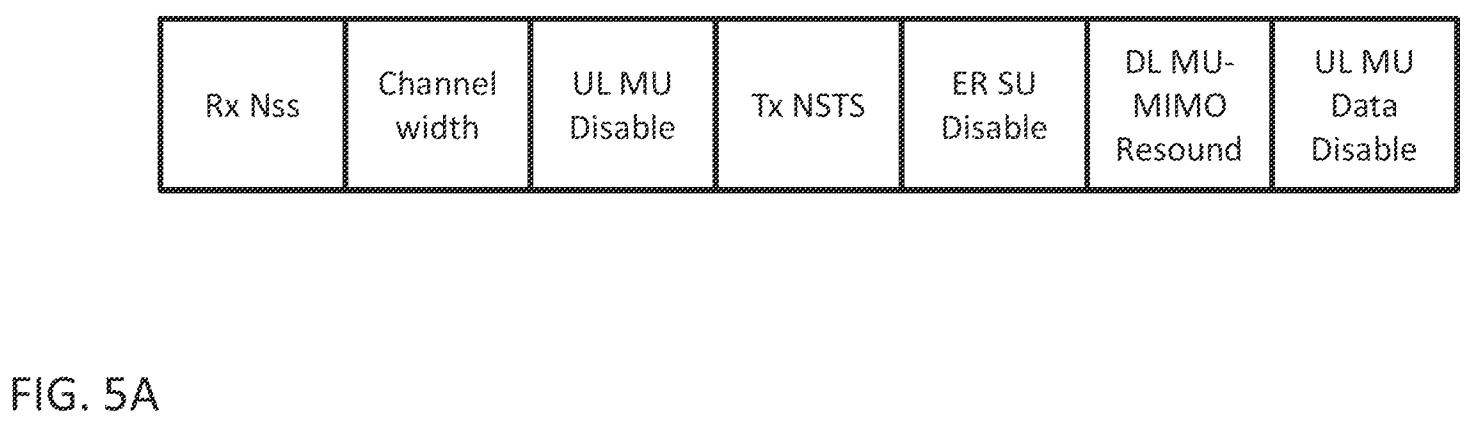

FIG. 5A shows a control information subfield format in an OM Control subfield of an Operating Mode Indication (OMI) frame. In some embodiments, a beamformee may dynamically negotiate spatial streams support and MCS support for MU, so that the beamformee may dictate or influence the beamformer algorithm to make an informed decision for optimal performance. In some embodiments, the ability for the beamformee to dictate or influence the beamformer algorithm in this manner is provided in part by enhancing the OM control field to add a new field for Receive Number of Spatial Streams (Rx Nss) for MU traffic in addition to the existing Rx Nss field of SU. FIG. 5B shows an example of an OMI format in such an embodiment. In the embodiment of FIG. 5B, the Rx Nss field has been renamed to "Rx SU Nss", and new fields have been added the OMI, including "Rx MU HE-MCS Map 80≤MHz", "Rx MU HE-MCS Map 160 MHz", "Rx MU HE-MCS Map 80+80 MHz" and "Rx MU Nssc". Each of the new MCS Map fields may declare, for a respective bandwidth (e.g., for 160 MHz), the station's capability to support a respective set of MCSs, per number of spatial streams (e.g., MCS 0-11 for one spatial stream, MCS 0-9 for two spatial streams, and so on). The new "Rx MU Nssc" may declare how many spatial streams the station is capable of receiving in MU mode. In such an embodiment, the station may, for example, send, to the beamformer, an Operating Mode Indication (OMI) declaring a change in the station Modulation Coding Scheme capability for a certain number of spatial streams. The beamformer may then send data via a number of spatial streams that is within the newly declared capability of the station. For example, after sending the OMI, the station may receive a Physical Layer Protocol Data Unit (PPDU), with a first MCS index less than the MCS index declared, as a capability, in the OMI (whereas before sending the OMI, the station may have received a Physical Layer Protocol Data Unit with a first MCS index greater than the MCS index declared, as a capability, in the OMI).

In some systems, SU mode and MU mode share common spatial stream and MCS capabilities negotiated by beamformee and beamformer. The Supported HE-MCS And Nss Set field indicates the combinations of HE-MCSs and spatial streams that a STA supports for reception and the combinations that it supports for transmission. The format of the field is shown in FIG. 6A.

In some embodiments, to make possible improved performance, the beamformee declares, during association, capabilities with respect to spatial level and MCS independently for SU and MU. FIG. 6B shows a subfield format for the additional fields (in addition to those of FIG. 6A) that may be part of an Association Request in such an embodiment. For example, the beamformee may send, to the beamformer, an Association Request comprising a Single-User (SU) MCS capability for a first bandwidth and a Multi-User (MU) MCS capability for the first bandwidth, the MU MCS capability being different from the SU MCS capability. The SU MCS capability may be greater than the MU MCS capability, and the beamformee may then receive, in SU mode, a Physical Layer Protocol Data Unit (PPDU) with an MCS index greater than the declared Multi-User (MU) MCS capability and less than the declared Single-User (SU) MCS capability. In another example, the MU MCS capability may be greater than the SU MCS capability, and the beamformee may then receive, in MU mode, a Physical Layer Protocol Data Unit (PPDU) with an MCS index less than the declared Multi-User (MU) MCS capability and greater than the declared Single-User (SU) MCS capability.

Figure 7A:
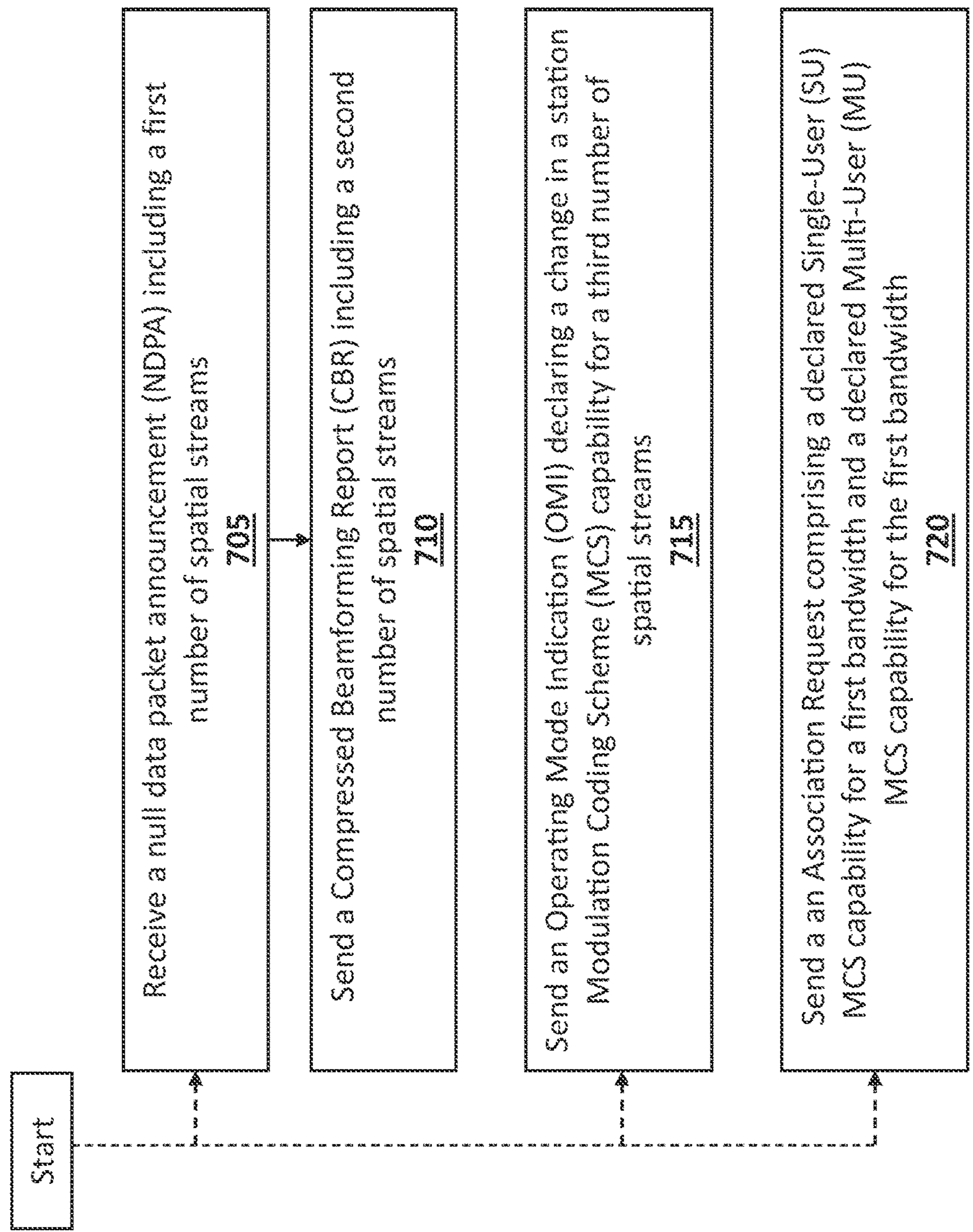
FIG. 7A is a flowchart, according to an embodiment of the present disclosure.

FIG. 7A shows a flowchart of a method, in some embodiments. In a first alternative, a station receives, at 705, from the access point, a null data packet announcement (NDPA) including a first number of spatial streams, and sends, at 710, to the access point, a Compressed Beamforming Report (CBR) including a second number of spatial streams, different from the first number of spatial streams. In a second alternative, the station sends, at 715, to the access point, an Operating Mode Indication (OMI) declaring a change in a station Modulation Coding Scheme (MCS) capability for a third number of spatial streams. In a third alternative, the station sends, at 720, to the access point, an Association Request comprising a declared Single-User (SU) MCS capability for a first bandwidth and a declared Multi-User (MU) MCS capability for the first bandwidth, the MU MCS capability being different from the SU MCS capability.

Figure 7B:
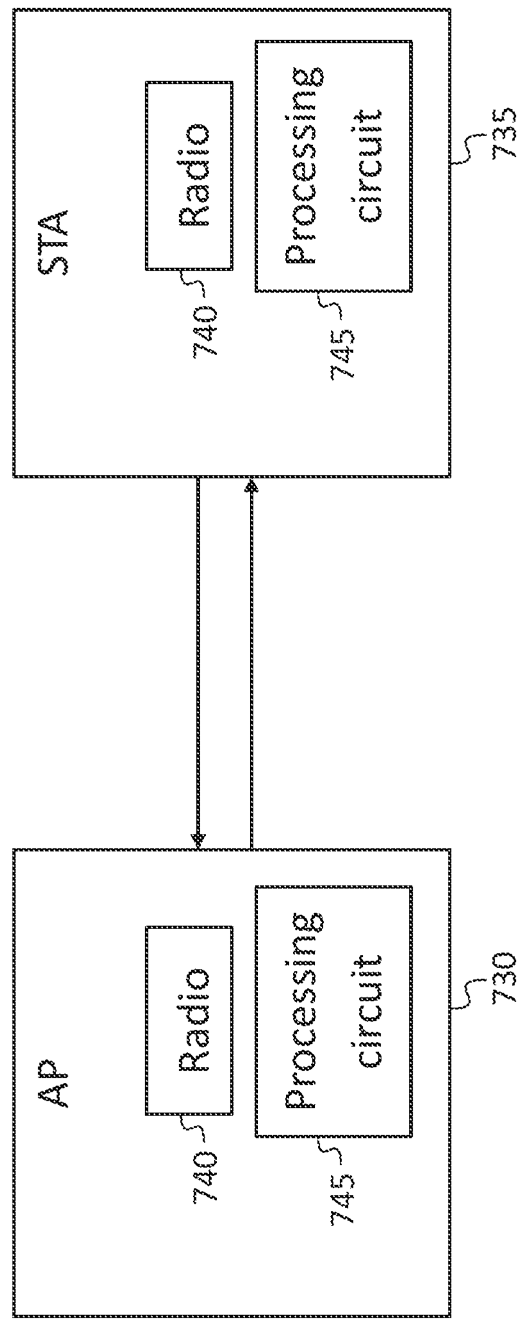
FIG. 7B is a block diagram, according to an embodiment of the present disclosure.

FIG. 7B shows a system including an Access Point (AP) 730 and a station (STA) 735, in communication with each other. Each of the AP and the STA may include a respective radio 740 and a respective processing circuit (or a means for processing) 745, which may perform various methods disclosed herein, e.g., the processing circuit 745 of the STA 735 may perform (using the radio 740 of the STA 735) the method illustrated in FIG. 7A. For example, the processing circuit 745 of the STA 735 may receive, via the radio 740 of the STA 735, transmissions from the AP 730, and the processing circuit 745 of the STA 735 may transmit, via the radio 740 of the STA 735, signals to the AP 730.

Regarding the supported Nss and MCS level, it may be noted that 802.11ax may not distinguish between SU and MU supported Nss and MCS level. When there is no inter-stream interference, indeed, a non-AP STA may support the same Nss and MCS level for SU and MU operation. However, when there is inter-stream interference, (depending on the level of interference) the supported Nss and MCS level for MU may be smaller than in the SU case. The level of inter-stream interference may increase as the time between sounding and data transmission is increased.

In some embodiments, two different sets of Supported Nss and MCS level and separate Rx Nss can be updated by, e.g., OMI (OM Control). Two sets of Rx Extremely High Throughput (EHT)-MCS Maps (e.g., SU and MU Rx EHT MCS Maps) may be employed: (i) an Rx EHT-MCS Map, which indicates the maximum value of the maximum MCS that can be received by the STA for each number of spatial stream using SU-MIMO, and (ii) a MU-MIMO Rx EHT-MCS Map which indicates the maximum value of the maximum MCS that can be received by the STA for each number of spatial stream using MU-MIMO.

Each Tx EHT-MCS Map may indicate the maximum value of the maximum MCS that can be transmitted by the STA for each number of spatial streams using either SU or MU-MIMO. FIG. 8 shows an example of a frame format.

In some embodiments, a suitable Rx/Tx EHT MCS Map may support 16 spatial streams (in IEEE 802.11be™ release 2 (R2)), and the MCS level may be increased to 15. As such, each subfield may be 4 bytes with the format illustrated in FIG. 9. In FIG. 9:

0 indicates support for EHT-MCS 0-7 for n spatial streams; for 1 spatial stream it includes EHT-MCS 15 (MCS 0-7, 15 is mandatory for 20 MHz only STA).
1 indicates support for EHT-MCS 0-9 for n spatial streams; for 1 spatial stream it includes EHT-MCS 15 (MCS 0-9, 15 is mandatory for all other STA).
2 indicates support for EHT-MCS 0-11 for n spatial streams; for 1 spatial stream it includes EHT-MCS 15.
3 indicates support for EHT-MCS 0-13 for n spatial streams; for 1 spatial stream it includes EHT-MCS 15.

It should be noted that EHT-MCS 14 can be indicated separately.

Figure 10:
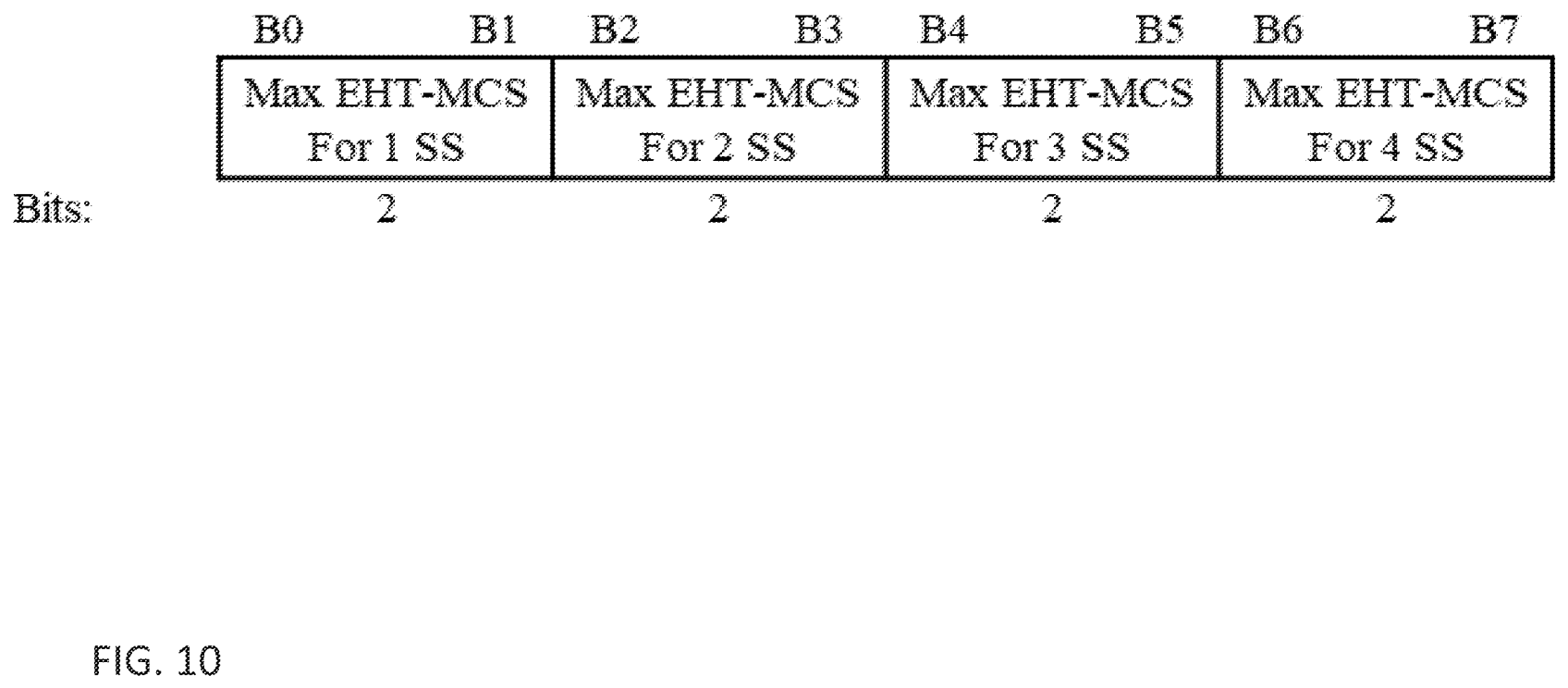

In some embodiments, in a MU-MIMO Rx EHT MCS Map, MU-MIMO supports up to 4 spatial streams (SS). So, each subfield may be 1 byte, with the format shown in FIG. 10, in which:

0 indicates support for EHT-MCS 0-7 for n spatial streams.
1 indicates support for EHT-MCS 0-9 for n spatial streams.
2 indicates support for EHT-MCS 0-11 for n spatial streams.
3 indicates support for EHT-MCS 0-13 for n spatial streams.

In some embodiments, a new operating mode notification frame action field format may be employed, as shown in the table of FIG. 11, which shows an Operating Mode Notification Frame Action Field Format.

Figure 12:
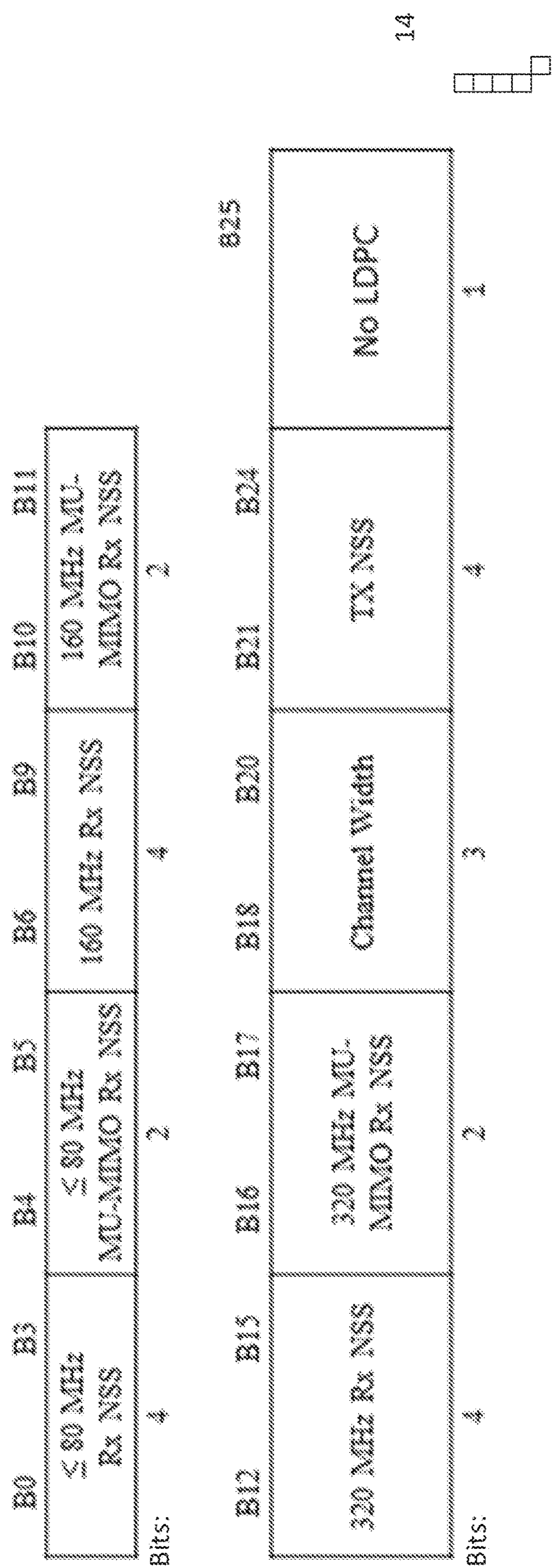
FIG. 12 shows a frame format, according to an embodiment of the present disclosure.

Extended Operating Mode may also be defined as standalone (e.g., an Information Element (IE) to be included in beacon and Probe response frame). In Extended Operating Mode, the Rx Nss indicates the maximum number of spatial streams that the STA supports in reception using SU-MIMO. The MU-MIMO Rx Nss indicates the maximum number of spatial streams that the STA supports in reception using MU-MIMO. 802.11be supports more bandwidth options, and may support separate Rx Nss subfields for each bandwidth option. A-Control can carry a maximum of 26 bits, so the STA may send OM Control to send other subfields (e.g., UL MU Disable, UL MU Data Disable, DL MU-MIMO Resound Recommendation, ER SU Disable). FIG. 12 shows an example of a suitable frame format.

Figure 13:
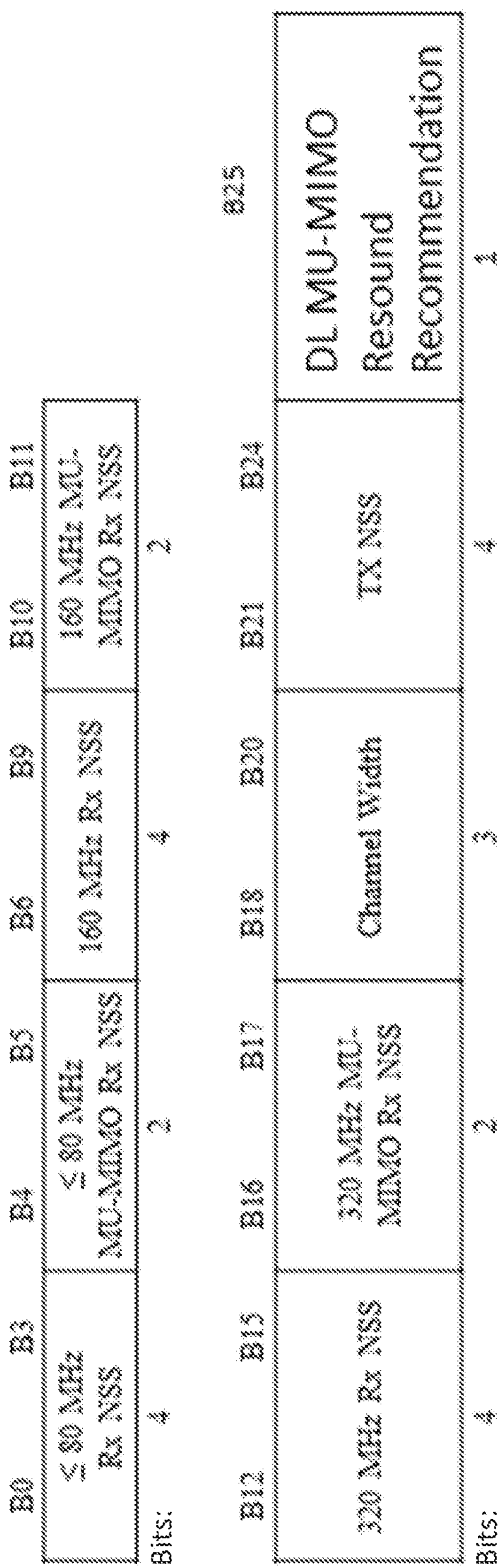
FIG. 13 shows a frame format, according to an embodiment of the present disclosure.

In some embodiments, a new A-control field, which has the functionality of existing OM Control, may be defined to accommodate this new field which may be formatted as shown in FIG. 13.

Supported EHT-MCS And Nss fields may include the following:

SU Rx EHT-MCS Map indicates the maximum value of the maximum MCS that can be received by the STA for each number of spatial streams using SU-MIMO.

MU Rx EHT-MCS Map indicates the maximum value of the maximum MCS that can be received by the STA for each number of spatial streams using MU-MIMO.

Tx EHT-MCS Map indicates the maximum value of the maximum MCS that can be transmitted by the STA for each number of spatial streams using either SU or MU-MIMO.

FIG. 14 shows an example of a suitable frame format.

Rx/Tx EHT MCS Map subfields may be formatted as shown in FIG. 15, in which:

0 indicates support for EHT-MCS 0-7 for n spatial streams; for 1 spatial stream it includes EHT-MCS 15.
1 indicates support for EHT-MCS 0-9 for n spatial streams; for 1 spatial stream it includes EHT-MCS 15.
2 indicates support for EHT-MCS 0-11 for n spatial streams; for 1 spatial stream it includes EHT-MCS 15.
3 indicates support for EHT-MCS 0-13 for n spatial streams; for 1 spatial stream it includes EHT-MCS 15.

It should be noted that EHT-MCS 14 can be indicated separately.

Figure 16:
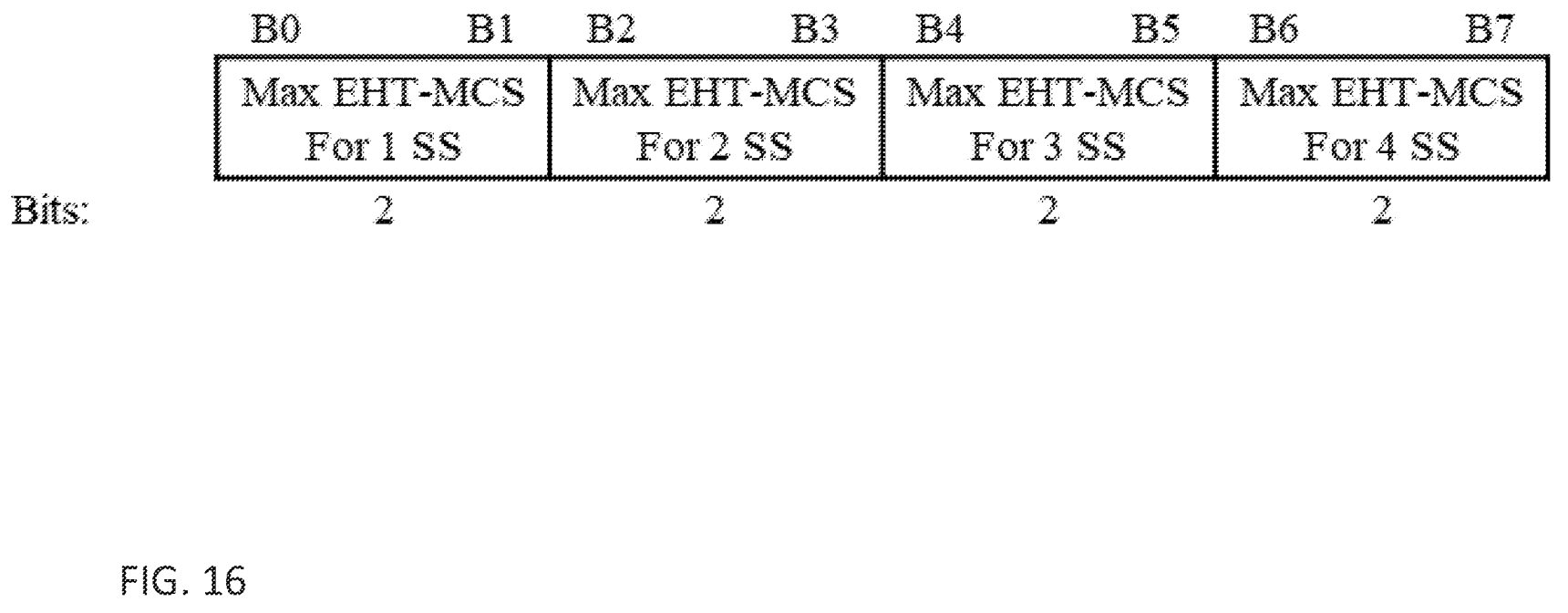

MU-MIMO Rx EHT MCS Map subfields may be formatted as shown in FIG. 16, in which:

0 indicates support for EHT-MCS 0-7 for n spatial streams.
1 indicates support for EHT-MCS 0-9 for n spatial streams.
2 indicates support for EHT-MCS 0-11 for n spatial streams.
3 indicates support for EHT-MCS 0-13 for n spatial streams.

Extended OM Control may be formatted as shown in FIG. 17, in which:

The Rx Nss indicates the maximum number of spatial streams that the STA supports in reception using SU-MIMO.

The MU-MIMO Rx Nss indicates the maximum number of spatial streams that the STA supports in reception using MU-MIMO.

Separate Rx Nss subfields are present for each bandwidth option.

Figure 18:
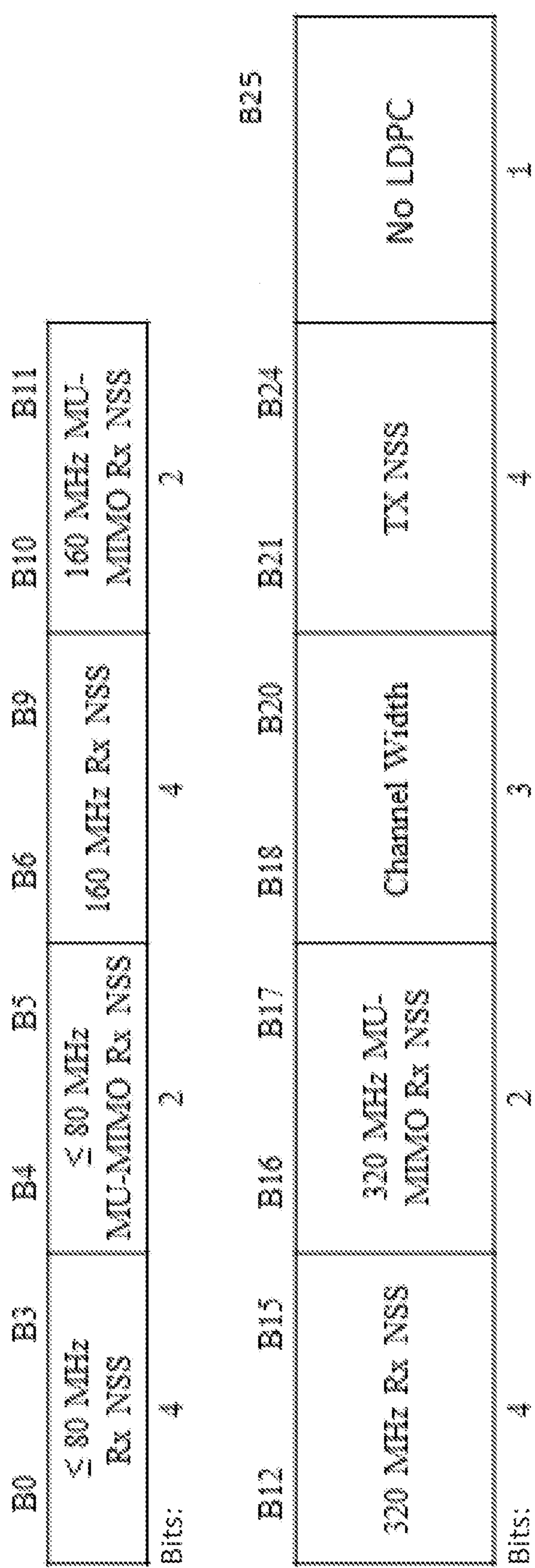
FIG. 18 shows a frame format, according to an embodiment of the present disclosure.

An IE for Extended Operating Mode Control may be formatted as shown in FIG. 18, in which:

The Rx Nss indicates the maximum number of spatial streams that the STA supports in reception using SU-MIMO.

The MU-MIMO Rx Nss indicates the maximum number of spatial streams that the STA supports in reception using MU-MIMO.

Separate Rx Nss subfields may be present for each bandwidth option.

Figure 19:
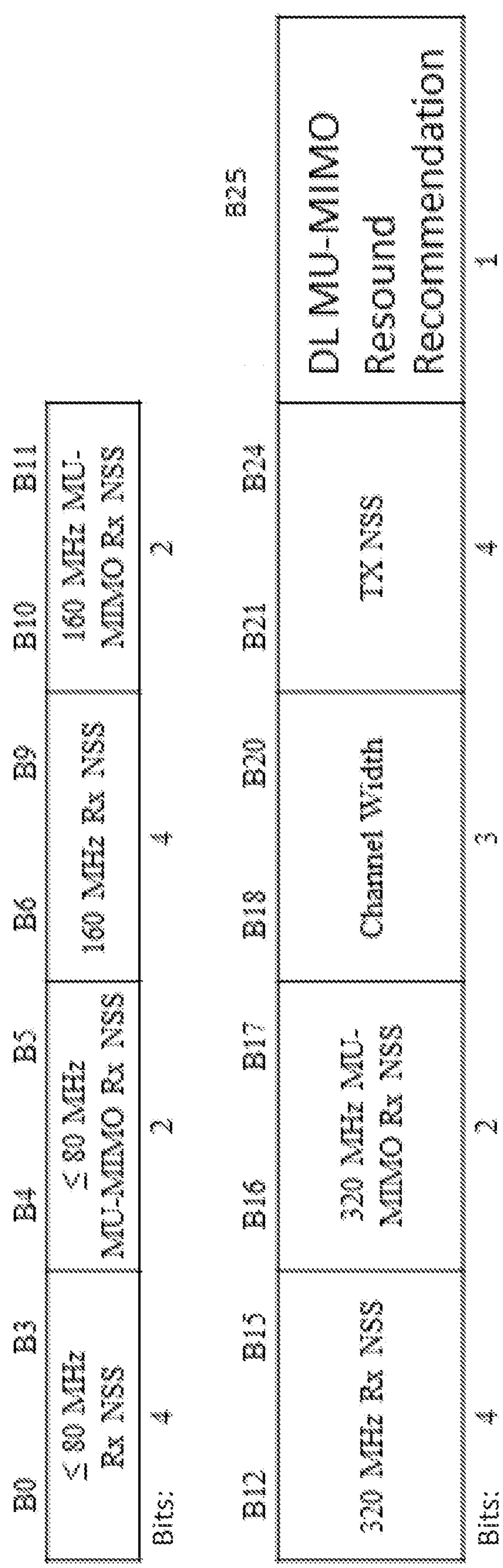
FIG. 19 shows a frame format, according to an embodiment of the present disclosure.

An additional type in A-Control field for Extended Operating Mode Control may be formatted as shown in FIG. 19.

Figure 20:
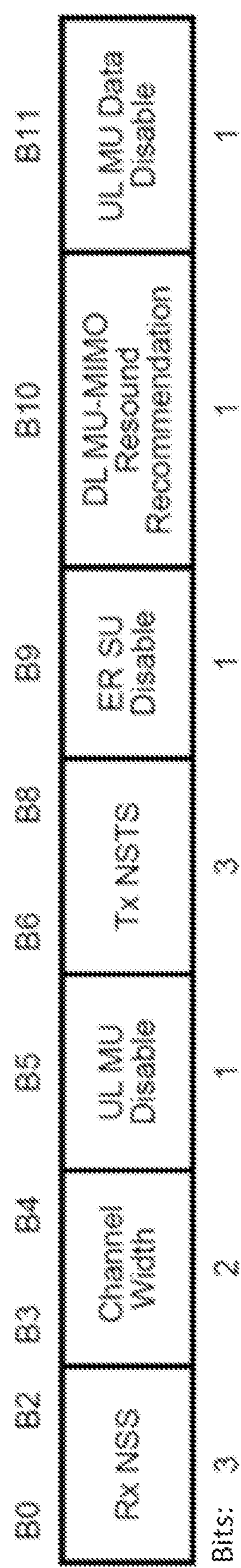
FIG. 20 shows a frame format, according to an embodiment of the present disclosure.

OM Control may be formatted as shown in FIG. 20, in which the Control Information subfield in an OM Control subfield contains information related to the operating mode (OM) change of the STA transmitting the frame containing this information.

If the operating channel width of the STA is greater than 80 MHz, then the Rx Nss subfield indicates the maximum number of spatial streams, Nss, that the STA supports in reception for PPDU bandwidths less than or equal to 80 MHz and is set to Nss−1. If the operating channel width of the STA is less than or equal to 80 MHz, then the Rx Nss subfield indicates the maximum number of spatial streams, Nss, that the STA supports in reception and is set to Nss−1.

Figure 22:
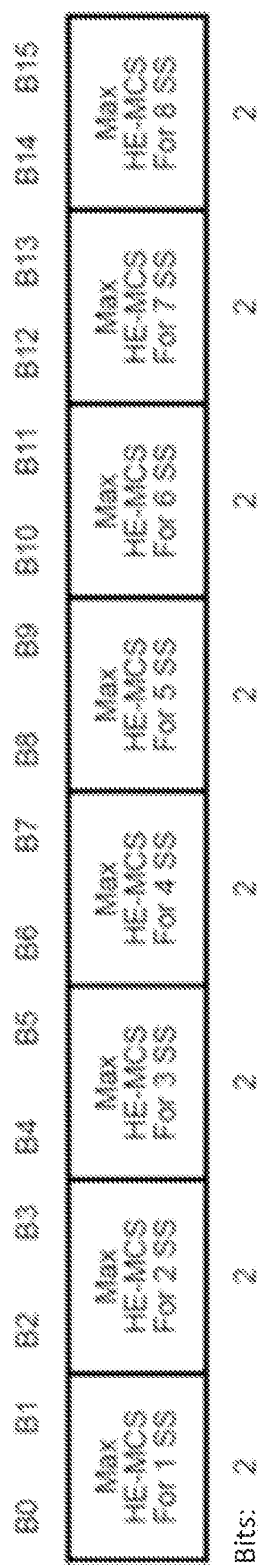
FIG. 22 shows a frame format, according to an embodiment of the present disclosure.

A Supported HE-MCS And Nss Set field may be formatted as shown in FIGS. 21 and 22, in which the Supported HE-MCS And Nss Set field indicates the combinations of HE-MCSs and spatial streams that a STA supports for reception and the combinations that it supports for transmission. The format of the field is shown in FIG. 21 (Supported HE-MCS And Nss Set field format). The Rx HE-MCS Map and Tx HE-MCS Map subfields may have the format shown in FIG. 22 (Rx HE-MCS Map subfield, Tx HE-MCS Map subfield and Basic HE-MCS And Nss Set field format).

The AP may be configured to include two sets of non-AP STA capabilities for Rx Nss, and MCS. It should be noted that a high MCS level may be sensitive to additional interference. For example, 1024 QAM and 4K QAM may be not suitable for MU-MIMO when using all antennas to receive spatial streams, e.g., MU-MIMO with Nss=2, MCS 10 to 13 when a non-AP STA has two receive antennas. From the link adaptation point of view, SU and MU show different performance; as such, two different (Rx Nss, MCS) link adaptation results should not be an issue. However, it may be advantageous for an AP to update the algorithm for switching between SU and MU.

Updating MU Rx Nss may result in re-grouping and re-sounding. Moreover, the AP may apply an updated MU Rx Nss from the next sounding, which means an MU Rx Nss update should only be applied for a sounding procedure (Max Nc value).

The following AP capabilities (using two bits) may also be considered: to accept different Nss for SU and MU; to accept different MCS for SU and MU; and/or to accept different Nss and MCS for SU and MU.

There may be two sets of Rx EHT-MCS Maps. The Rx EHT-MCS Map may indicate a maximum value of the maximum MCS that may be received by the STA for each number of spatial streams using SU-MIMO. The MU-MIMO Rx EHT-MCS Map may indicate a maximum value of the maximum MCS that may be received by the STA for each number of spatial streams using MU-MIMO.

The Tx EHT-MCS Map (which may be included in the frame format of FIG. 23) may indicate a maximum value of the maximum MCS that may be transmitted by the STA for each number of spatial streams using either SU or MU-MIMO.

The Rx/Tx EHT MCS Map may support 16 spatial streams (in R2), and MCS level may be increased to 15. So, each subfield can be 4 bytes with the format of FIG. 24.

In the format of FIG. 24, for 20 MHz STAs: 0 indicates support for EHT-MCS 0-7 for n spatial streams, and for 1 spatial stream, it includes EHT-MCS 15 (MCS 0-7, 15 is mandatory for 20 MHz only STA); 1 indicates support for EHT-MCS 0-9 for n spatial streams, and for 1 spatial stream, it includes EHT-MCS 15 (MCS 0-9, 15 is mandatory for all other STA); 2 indicates support for EHT-MCS 0-11 for n spatial streams, and for 1 spatial stream it includes EHT-MCS 15; and 3 indicates support for EHT-MCS 0-13 for n spatial streams, and for 1 spatial stream it includes EHT-MCS 15.

For other STAs: 0 indicates support for EHT-MCS 0-9 for n spatial streams, and for 1 spatial stream it includes EHT-MCS 15; 1 indicates support for EHT-MCS 0-11 for n spatial streams, and for 1 spatial stream it includes EHT-MCS 15; 2 indicates support for EHT-MCS 0-13 for n spatial streams, and for 1 spatial stream it includes EHT-MCS 15; and 3 indicates that n spatial streams is not supported for EHT PPDUs.

It should be noted that EHT-MCS 14 may be indicated separately.

Figure 25:
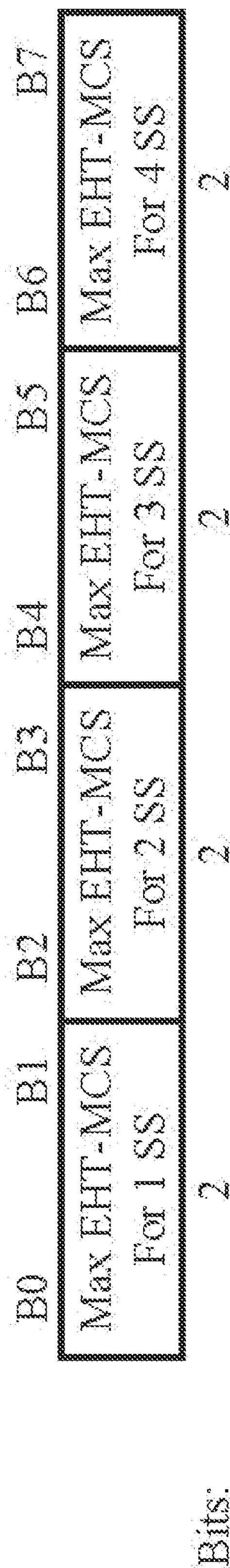
FIG. 25 shows a frame format, according to an embodiment of the present disclosure.

The MU-MIMO supports up to four spatial streams (SS), so each subfield may be 1 byte with the format of FIG. 25. In the format of FIG. 25, for 20 MHz STAs: 0 indicates support for EHT-MCS 0-7 for n spatial streams; 1 indicates support for EHT-MCS 0-9 for n spatial streams; 2 indicates support for EHT-MCS 0-11 for n spatial streams; and 3 indicates support for EHT-MCS 0-13 for n spatial streams.

For other STAs: 0 indicates support for EHT-MCS 0-9 for n spatial streams; 1 indicates support for EHT-MCS 0-11 for n spatial streams; 2 indicates support for EHT-MCS 0-13 for n spatial streams; and 3 indicates that n spatial streams is not supported for EHT PPDUs.

An Extended Operating Mode Notification Frame Format may include an extended operating mode notification frame action field format as illustrated in the table of FIG. 26. The Extended Operating Mode may also be defined as a stand-alone Information Element (IE) that may be included in a beacon and a Probe response frame.

Figure 27:
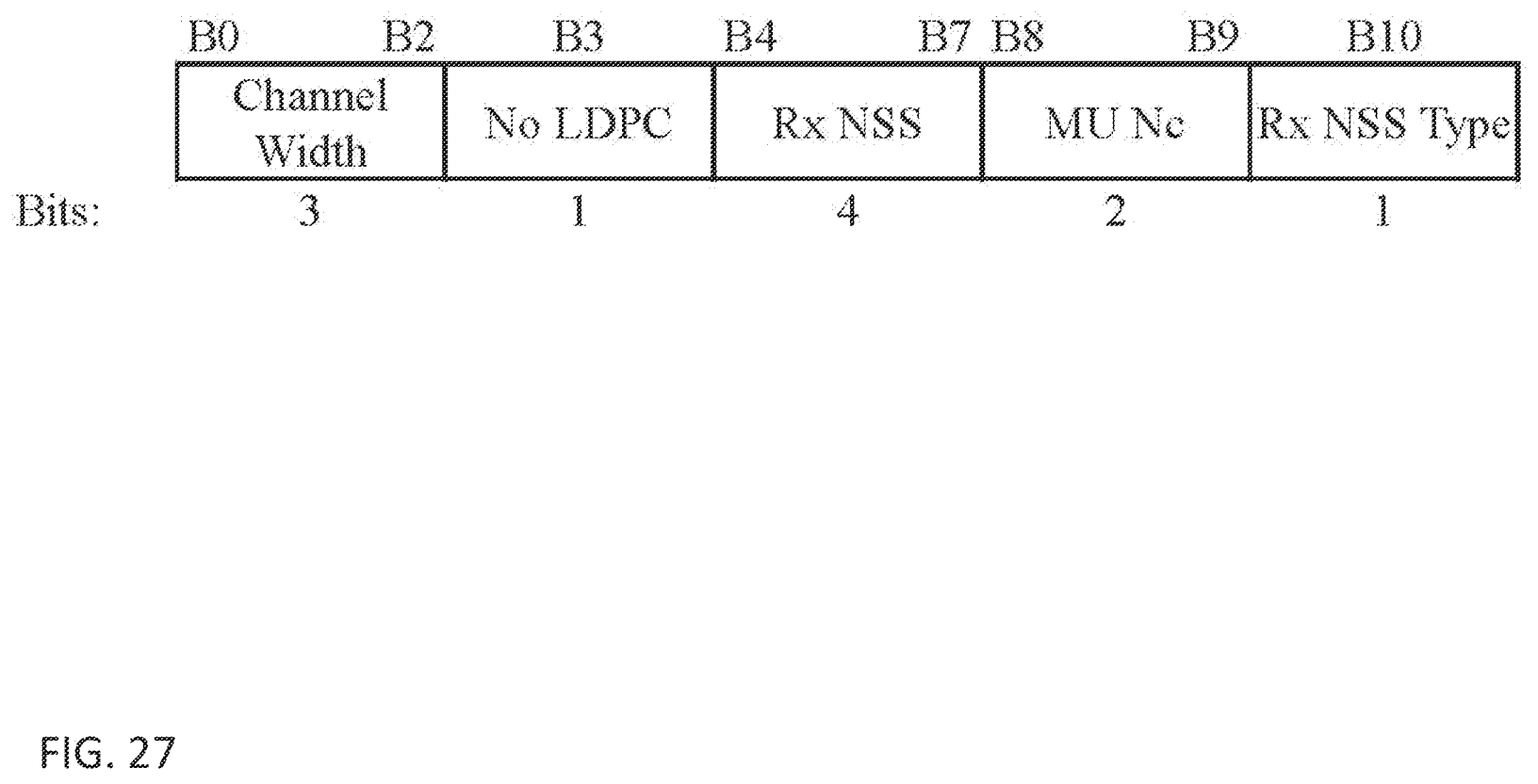

In the Extended Operating Mode, the Rx Nss may indicate a maximum number of spatial streams that a STA supports in reception using SU-MIMO. The MU-MIMO Rx Nss may indicate the maximum number of spatial streams that the STA supports in reception using MU-MIMO. As an 802.11be support for a higher bandwidth option, separate Rx Nss subfields may be used for each bandwidth option. FIG. 27 shows an example of an Operating Mode field format.

Figure 28:
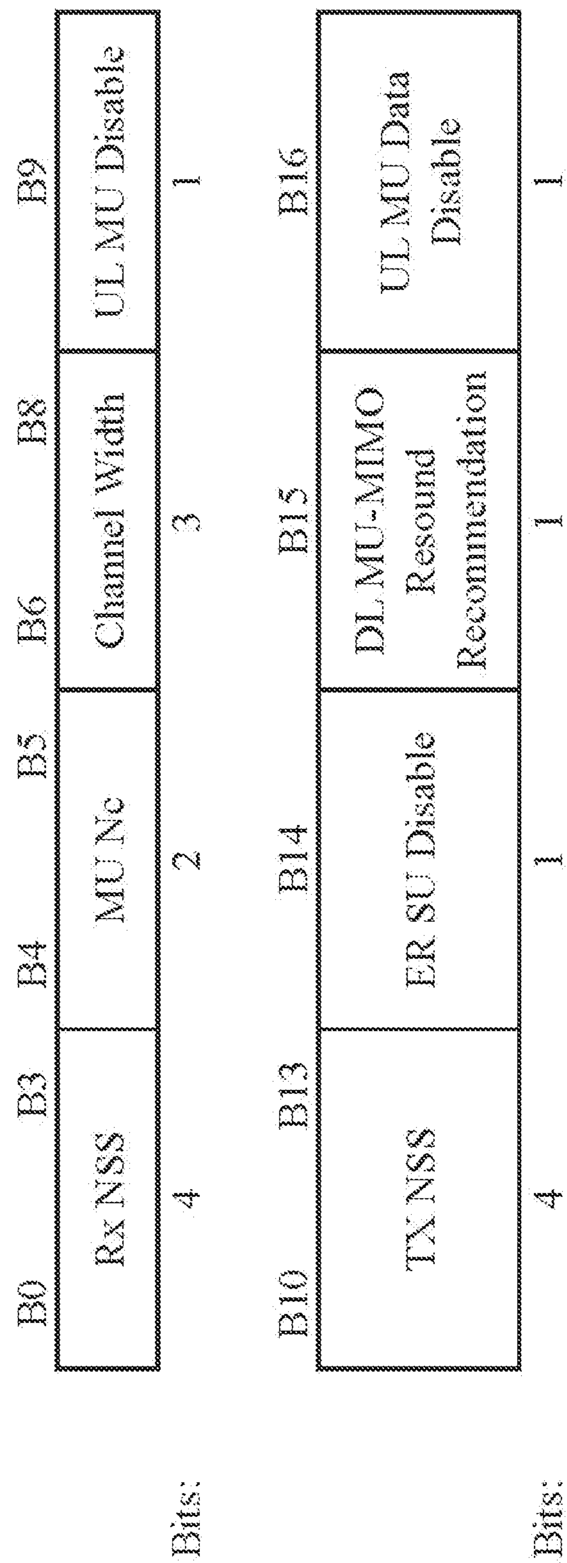
FIG. 28 shows a frame format, according to an embodiment of the present disclosure.

The Extended Operating Mode Control as a part of A-Control may include a new A-Control field that has the functionality of existing OM Control. This can be defined to accommodate a new field that may appear as illustrated in FIG. 28, which shows an example of Extended OM Control format.

A Supported EHT-MCS And Nss field may be defined as follows. The SU Rx EHT-MCS Map may indicate a maximum value of the maximum MCS that may be received by the STA for each number of spatial streams using SU-MIMO. The MU Rx EHT-MCS Map may indicate the maximum value of the maximum MCS that may be received by the STA for each number of spatial streams using MU-MIMO. The Tx EHT-MCS Map may indicate a maximum value of the maximum MCS that can be transmitted by the STA for each number of spatial streams using either SU or MU-MIMO. FIG. 29 shows an example of a suitable frame format.

MCS 0-7 for n spatial streams, for 1 spatial stream it includes EHT-MCS 15; a 1 may indicate support for EHT-MCS 0-9 for n spatial streams, for 1 spatial stream it includes EHT-MCS 15; a 2 may indicate support for EHT-MCS 0-11 for n spatial streams, for 1 spatial stream it includes EHT-MCS 15; and a 3 may indicate support for EHT-MCS 0-13 for n spatial streams, for 1 spatial stream it includes EHT-MCS 15. It should be noted that EHT-MCS 14 can be indicated separately. FIG. 30 shows an example of a suitable frame format.

Figure 31:
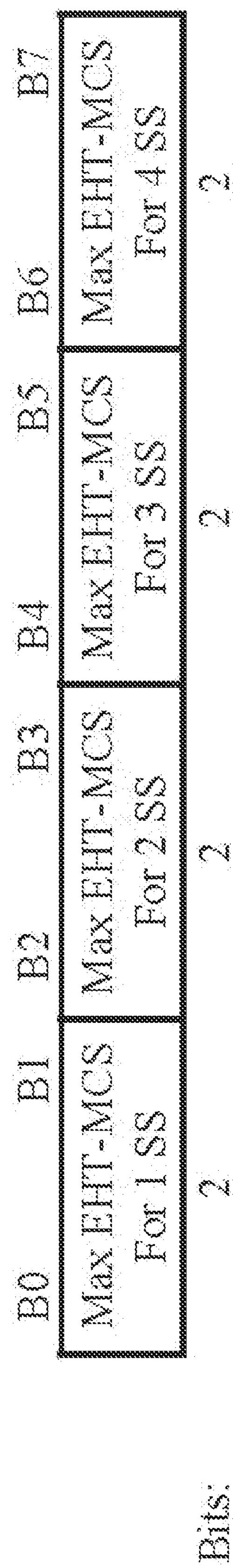
FIG. 31 shows a frame format, according to an embodiment of the present disclosure.

MU-MIMO Rx EHT MCS Map subfields may be defined as follows: A 0 may indicate support for EHT-MCS 0-7 for n spatial streams; a 1 may indicate support for EHT-MCS 0-9 for n spatial streams; a 2 may indicate support for EHT-MCS 0-11 for n spatial streams; and a 3 may indicate support for EHT-MCS 0-13 for n spatial streams. FIG. 31 shows an example of a suitable frame format.

A two-bit MU-MIMO Rx Nss in (Extended/EHT) Operating Mode field may be added. The MU-MIMO Rx Nss may indicate a maximum number of spatial streams that the STA supports in reception using MU-MIMO. The Rx Nss may indicate the maximum number of spatial streams that the STA supports in reception using SU-MIMO.

A two-bit MU-MIMO Rx Nss in A-Control field for (Extended/EHT) Operating Mode Control may be added. The MU-MIMO Rx Nss may indicate a maximum number of spatial streams that the STA supports in reception using MU-MIMO. The Rx Nss may indicate the maximum number of spatial streams that the STA supports in reception using SU-MIMO.

A Control Information subfield in an OM Control subfield may contain information related to the operating mode (OM) change of a STA transmitting the frame containing this information (see IEEE P802.11ax™/D8.0 Section 26.9 (Operating mode indication)). If the operating channel width of the STA is greater than 80 MHz, then the Rx Nss subfield may indicate the maximum number of spatial streams Nss that the STA supports in reception for PPDU bandwidths less than or equal to 80 MHz and is set to Nss−1. If the operating channel width of the STA is less than or equal to 80 MHz, then the Rx Nss subfield may indicate the maximum number of spatial streams Nss that the STA supports in reception and may be set to Nss−1. FIG. 32 shows an example of a suitable frame format.

The Supported HE-MCS And Nss Set field may indicate the combinations of HE-MCSs and spatial streams that a STA supports for reception and the combinations that it supports for transmission. The format of the field is shown in FIG. 33 (Supported HE-MCS And Nss Set field format). The Rx HE-MCS Map and Tx HE-MCS Map subfields may have the format shown in FIG. 34 (Rx HE-MCS Map subfield, Tx HE-MCS Map subfield and Basic HE-MCS And Nss Set field format).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for downlink feedback have been specifically described and illustrated herein, many modifications and variations will be apparent to those skilled in the art. Accordingly, it is to be understood that a system and method for downlink feedback constructed according to principles of this disclosure may be embodied other than as specifically described herein. The invention is also defined in the following claims, and equivalents thereof.

What is claimed is:

1. A system comprising:

a station comprising a radio and a processing circuit, the processing circuit being configured to:

send, to an access point, an Operating Mode Indication (OMI) declaring a change in a station Modulation Coding Scheme (MCS) capability for a third number of spatial streams based on the station detecting performance degradation with an MCS configuration negotiated during association, wherein the OMI comprises a first field associated with a Multi-User (MU) MCS capability and a second field associated with a Single-User (SU) MCS capability.

2. The system of claim 1, wherein:

the processing circuit is configured to:

receive, from the access point, a null data packet announcement including a first number of spatial streams, and send, to the access point, a Compressed Beamforming Report including a second number of spatial streams, different from the first number of spatial streams, wherein the second number of spatial streams is determined by the station based on other beamformees that are present in an MU group with the station.

3. The system of claim 2, wherein the processing circuit is further configured to receive a Physical Layer Protocol Data Unit (PPDU) via the second number of spatial streams.

4. The system of claim 1, wherein:

the processing circuit is further configured to receive, after the sending of the OMI, a Physical Layer Protocol Data Unit (PPDU) with a first MCS index less than or equal to an MCS index declared, as a capability, in the OMI.

5. The system of claim 1, wherein the processing circuit is configured to:

send, to the access point, an Association Request comprising a declared SU MCS capability for a first bandwidth and a declared MU MCS capability for the first bandwidth, the MU MCS capability being different from the SU MCS capability.

6. The system of claim 5, wherein:

the SU MCS capability is greater than the MU MCS capability; and the processing circuit is further configured to receive, in SU mode, a Physical Layer Protocol Data Unit (PPDU) with an MCS index greater than the MU MCS capability and less than or equal to the SU MCS capability.

7. A system comprising:

a station comprising a radio and a processing circuit, the processing circuit being configured to:

send, to an access point, an Association Request comprising a declared Single-User (SU) Modulation Coding Scheme (MCS) capability for a first bandwidth and a declared Multi-User (MU) MCS capability for the first bandwidth, the MU MCS capability being different from the SU MCS capability.

8. The system of claim 7, wherein the SU MCS capability is greater than the MU MCS capability, and the processing circuit is further configured to:

receive, in SU mode, a Physical Layer Protocol Data Unit (PPDU) with an MCS index greater than the MU MCS capability and less than or equal to the SU MCS capability.

9. The system of claim 7, wherein the SU MCS capability is less than or equal to the MU MCS capability, and the processing circuit is further configured to:

receive, in an MU mode, a Physical Layer Protocol Data Unit (PPDU) with an MCS index less than or equal to the MU MCS capability and greater than the SU MCS capability.

10. The system of claim 7, wherein:

the processing circuit is configured to:

receive, from the access point, a null data packet announcement including a first number of spatial streams, and send, to the access point, a Compressed Beamforming Report including a second number of spatial streams, different from the first number of spatial streams, wherein the second number of spatial streams is determined by the station based on other beamformees that are present in an MU group with the station.

11. The system of claim 10, wherein:

the processing circuit is configured to:

send, to an access point, an Operating Mode Indication (OMI) declaring a change in a station Modulation Coding Scheme (MCS) capability for a third number of spatial streams based on the station detecting performance degradation with an MCS configuration negotiated during association, wherein the OMI comprises a first field associated with a Multi-User (MU) MCS capability and a second field associated with a Single-User (SU) MCS capability; and send, to the access point, an Association Request comprising a declared SU MCS capability for a first bandwidth and a declared MU MCS capability for the first bandwidth, the MU MCS capability being different from the SU MCS capability.

12. The system of claim 10, wherein the processing circuit is further configured to receive a Physical Layer Protocol Data Unit (PPDU) via the second number of spatial streams.

13. A system comprising:

a station comprising a radio and a processing circuit, the processing circuit being configured to:

receive, from an access point, a null data packet announcement (NPDA) including a first number of spatial streams, send, to the access point, a Compressed Beamforming Report (CBR) including a second number of spatial streams, different from the first number of spatial streams, wherein the second number of spatial streams is determined by the station based on other beamformees that are present in a Multi-User (MU) group with the station, and send, to the access point, an Operating Mode Indication (OMI) declaring a change in a station Modulation Coding Scheme (MCS) capability for a third number of spatial streams.

14. The system of claim 13, wherein the processing circuit is further configured to receive a Physical Layer Protocol Data Unit (PPDU) via the second number of spatial streams.

* * * * *